(12) United States Patent
Zhang et al.

(10) Patent No.: US 6,856,441 B2
(45) Date of Patent: Feb. 15, 2005

(54) METHOD OF TUNING WAVELENGTH TUNABLE ELECTRO-ABSORPTION MODULATORS

(75) Inventors: Liyan Zhang, Clarksville, MD (US); Newton C. Frateschi, Breingisville, PA (US); Jiaming Zhang, Breingsville, PA (US); Aaron Bond, Orefiled, PA (US)

(73) Assignee: T-Networks, Inc., Allentown, PA (US)

( * ) Notice: Subject to any disclaimer, the term of this patent is extended or adjusted under 35 U.S.C. 154(b) by 0 days.

(21) Appl. No.: 10/647,485

(22) Filed: Aug. 25, 2003

(65) Prior Publication Data

US 2004/0090659 A1 May 13, 2004

Related U.S. Application Data

(60) Provisional application No. 60/405,555, filed on Aug. 23, 2002.

(51) Int. Cl.[7] .................................................. G02F 1/03
(52) U.S. Cl. ....................................... 359/245; 359/240
(58) Field of Search ................................ 359/245, 240, 359/248, 249; 398/192; 385/2, 8; 257/14

(56) References Cited

U.S. PATENT DOCUMENTS 5,784,188 A    7/1998  Nakamura et al.
5,959,764 A  *  9/1999  Edagawa et al. ............ 359/326
6,590,686 B1 *  7/2003  Sekiya et al. ................ 398/183
6,661,556 B2 * 12/2003  Bond et al. .................. 359/245

* cited by examiner

Primary Examiner—Scott J. Sugarman
Assistant Examiner—Richard Hanig
(74) Attorney, Agent, or Firm—RatnerPrestia

(57) ABSTRACT

A method of tuning an electroabsorption modulator (EAM). A reference average power loss factor for light having a reference peak wavelength that is modulated by the EAM is provided. This loss factor is based on operation of the EAM using a reference bias voltage, a reference temperature, and a reference modulation signal which has a predetermined duty cycle. Input light is coupled into the EAM and modulated using a modulation signal which has the same duty cycle as the reference modulation signal. The input power of the input light and the average output power of light emitted from the EAM are measured. These input and average output powers are used to generate an average power loss factor. The average power loss factor is compared to the reference average power loss factor and the bias voltage and/or the temperature of the EAM are adjusted to reduce differences between these loss factors.

20 Claims, 21 Drawing Sheets

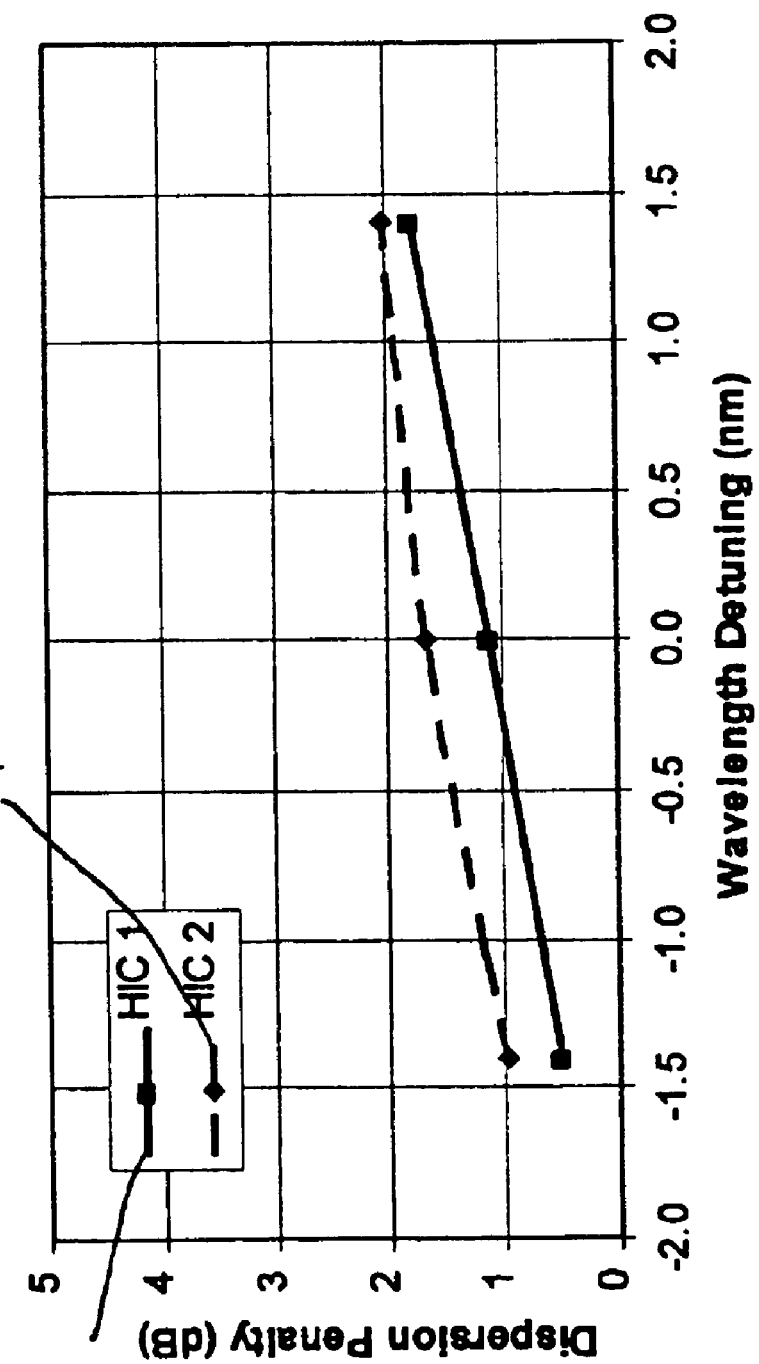

HIC1: −1.4 nm    0 nm    1.4 nm

HIC2: −1.4 nm    0 nm    1.4 nm 2000
2002
2004
2006

METHOD OF TUNING WAVELENGTH TUNABLE ELECTRO-ABSORPTION MODULATORS

CROSS-REFERENCE TO RELATED APPLICATIONS

This application claims the benefit of U.S. Provisional Application No. 60/405,555, filed Aug. 23, 2002, the contents of which are incorporated herein by reference.

FIELD OF THE INVENTION

This invention is in the field of electro-optical components, and specifically relates to a method for tuning electro-absorption modulators (EAM's).

BACKGROUND OF THE INVENTION

Electro-absorption modulators (EAM's) are a promising technology due to its small package size and its low drive-voltage, as well as its great potential for high degree opto-electronic integration to reduce the overall size of the transponders and transmitters in the wavelength-division multiplexing (WDM) fiber optic networks. As WDM optical networks increase rapidly in their size and complexity, wavelength tunability of the transponders and transmitters become desirable for inventory reduction, and for network management such as provisioning, dynamic provisioning and demand restoration in the optical layer.

The dominant light sources used in current WDM transmission equipment are the distributed-feedback (DFB) lasers with high average output power (13 dBm). While wide-band tunable lasers are becoming available with equivalent performance to that of DFB's, their cost-premium may hinder their wide spread adoption in the WDM networks. Although DFB only has tunability of a few nanometers by temperature, its low cost structure and its incumbent technology status call for a full exploration of its tunability before WDM equipment manufacturers opt for other more costly alternatives. EAM's are intrinsically wide bandwidth devices and have a packaged size typically a quarter of the competing technology. These devices are ideal modulators to work with DFB's in a number of applications, such as 8-channel 50 GHz-spacing transponders. Also, the main material system that the EAM modulators are built upon is Indium Phosphide (InP), which can be simultaneously used to build devices to generate, modulate, amplify and detect light at wavelengths used in WDM transmission systems. This commonality opens the door for high degree of integration, either by hybrid approach or eventually monolithically.

SUMMARY OF THE INVENTION

One embodiment of the present invention is an exemplary method of tuning a wavelength tunable electroabsorption modulator (EAM). A reference average power loss factor for light having a reference peak wavelength that is modulated by the wavelength tunable EAM is provided. The reference average power loss factor is based on operation of the wavelength tunable EAM using a reference bias voltage, a reference temperature, and a reference modulation signal which has a predetermined duty cycle. An input light beam is optically coupled into the wavelength tunable EAM and modulated using a modulation signal which has the same duty cycle as the reference modulation signal. The input power of light provided to the wavelength tunable EAM and the average output power of light emitted from the wavelength tunable EAM are measured. These measured input and average output powers are used to generate an average power loss factor. The average power loss factor is compared to the reference average power loss factor and the bias voltage and/or the temperature of the wavelength tunable EAM are adjusted to reduce differences between the average power loss factor and the reference average power loss factor, thereby tuning the wavelength tunable EAM.

Another embodiment of the present invention is an alternative exemplary method of tuning a wavelength tunable electroabsorption modulator (EAM). A reference average output power for light that is modulated by the wavelength tunable EAM is provided. The input power and reference peak wavelength of the light are predetermined. The reference average output power is based on operation of the wavelength tunable EAM using a reference bias voltage, a reference temperature, and a reference modulation signal which has a predetermined duty cycle. An input light beam is optically coupled into the wavelength tunable EAM. This input light beam has approximately the input power as the light used to determine the reference values, and an operational peak wavelength. The light is modulated within the wavelength tunable EAM using a modulation signal having the same duty cycle as the reference modulation signal. The average output power of the modulated light beam emitted from the wavelength tunable EAM is measured and compared to the reference average output power. The bias voltage and/or the temperature of the wavelength tunable EAM are adjusted to reduce the difference between the average output power and the reference average output power, thereby tuning the wavelength tunable EAM.

An additional embodiment of the present invention is another exemplary method of tuning a wavelength tunable electroabsorption modulator (EAM). An input light beam, which has an operational peak wavelength, is coupled into the wavelength tunable EAM. This light is modulated within the wavelength tunable EAM using a modulation signal which has a 50% duty cycle. The modulated light beam emitted from the wavelength tunable EAM is measured to generate an eye diagram for the modulated light beam. An optical eye crossing point for the modulated light beam is determined from the resulting eye diagram. The bias voltage and/or the temperature of the wavelength tunable EAM are adjusted such that the optical eye crossing point equals approximately 50%, thereby tuning the wavelength tunable EAM.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIGS. 7, 8, and 10 are graphs illustrating experimental performance of exemplary EAM's over certain wavelength ranges.

DETAILED DESCRIPTION

The present invention involves exemplary methods for tuning electroabsorption modulators (EAM's) over a range of wavelengths to allow a single modulator to work in electro-optical components designed to operate at different wavelength. For example a single wavelength tunable EAM could function in transmitters for any of several channels in a wavelength division multiplexed (WDM) optical communication system. Such versatility may desirably reduce the inventory of replacement parts needed by the operator of a WDM optical communication system.

Although the inherently wide bandwidth performance capabilities of EAM's is known, methods of tuning an EAM for optimal performance at various wavelengths have been undesirably complex and expensive for general implementation. Optimal, or near optimal, performance of the modulator is desirable in an optical communications system. Higher data transmission rates, longer reaches, and more accurate transmission of information may all be achieved by improving modulator performance. Additionally, improved modulator performance may desirably allow the use of less expensive components such as less sensitive receivers in optical communication systems.

A number of variables, such as the extinction ratio of the EAM, the amount of chirp introduced in the signal during modulation, and the amount of signal lost during modulation, all affect the performance of an EAM. Changing the bias voltage, temperature, or modulation amplitude of an EAM affect all of these variables to various degrees. Direct measurement of these variables may require sensitive, high-speed test equipment, and analysis of the results to determine an optimal setting may not be straightforward and simple. These issues may not be overly problematic in a laboratory setting, but they are undesirable for installation, repair, and replacement of optical components in a typical non-laboratory setting. The present invention offers simpler exemplary tuning methods, which may also utilize less expensive equipment.

Figure 1:
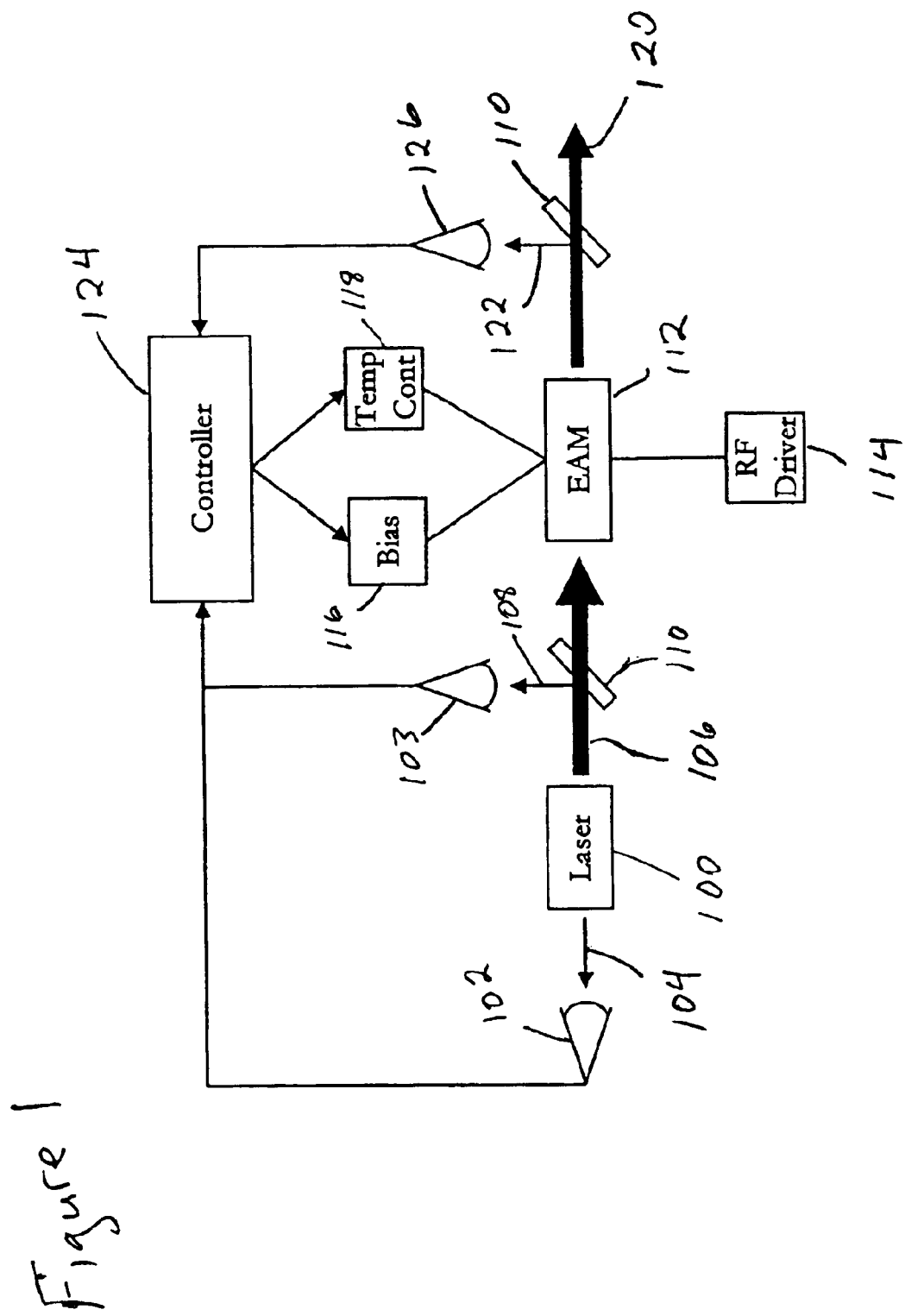
FIG. 1 is a block diagram of an exemplary configuration for tuning a wavelength tunable electroabsorption modulator (EAM) according to the present invention.
Figure 2:
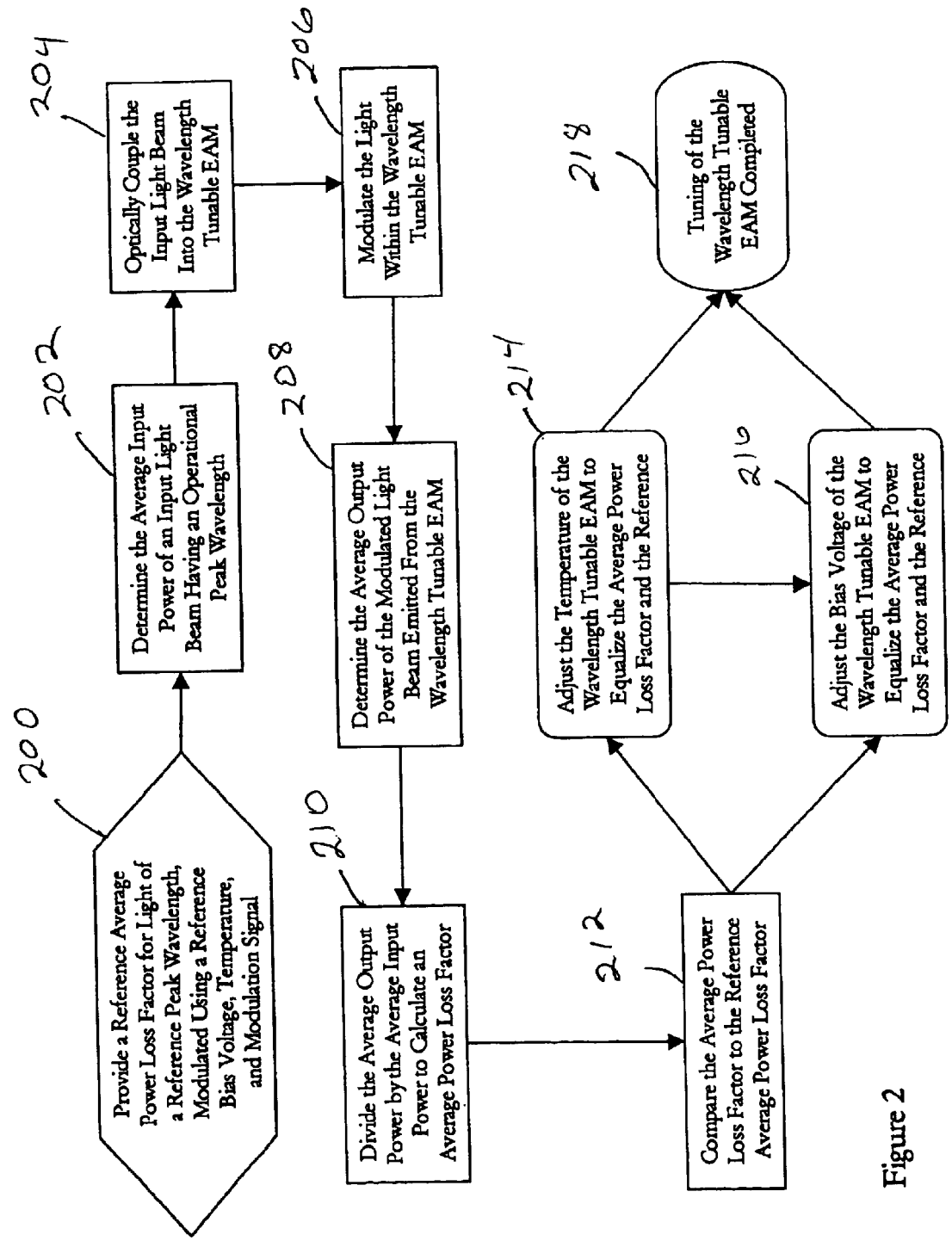
FIG. 2 is a flowchart illustrating an exemplary method of tuning a wavelength tunable EAM using the exemplary configuration of FIG. 1.
Figure 3:
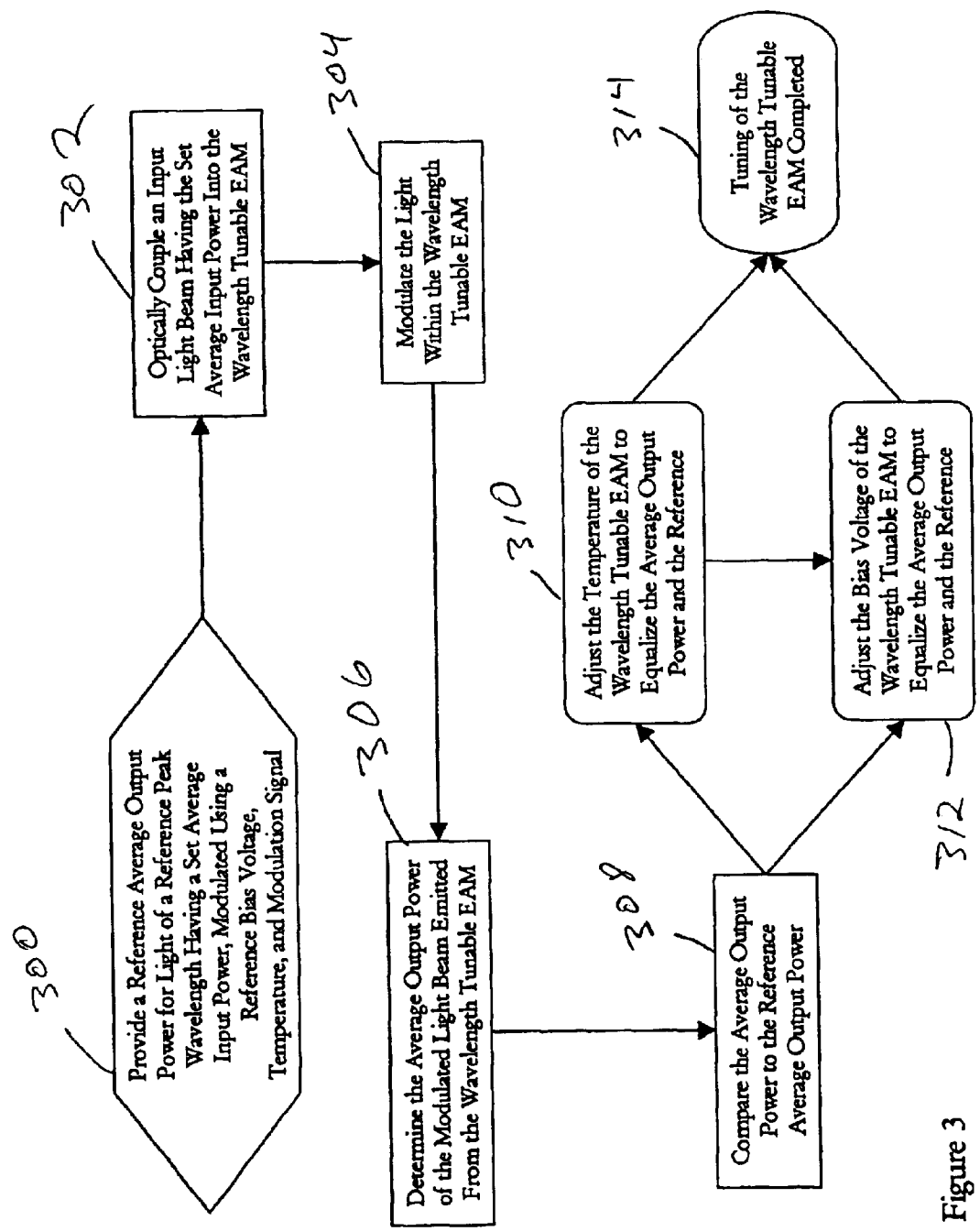
FIG. 3 is a flowchart illustrating an additional exemplary method of tuning a wavelength tunable EAM using the exemplary configuration of FIG. 1.

FIG. 1 illustrates an exemplary block diagram of a configuration that may be used to accomplish the exemplary methods of FIGS. 2 and 3. This exemplary configuration includes laser light source 100 and wavelength tunable EAM 112. The average input power of input light beam 106 emitted by laser 100 may be monitored by either one, or both, of photodetectors 102 and 103, using rear facet leakage light 104 and tapped light signal 108, respectively. The average output power of modulated light beam 120 emitted from wavelength tunable EAM 112 may be monitored by photodetector 126, using tapped light signal 122. These photodetectors may be any standard low speed photodetectors, such as photodiodes, photoresistors, and phototransistors. Beam splitters 110 are shown in the beam paths of input light beam 106 and modulated light beam 120 to separate tapped light signals 108 and 122, respectively. It is noted that input light beam 106 and modulated light beam 120 be transmitted in waveguides and other means, such as spliced optical fibers or evanescent coupling from waveguides, may be used to separate tapped light signals 108 and 122. Alternatively, photodetectors 103 and 126 may be monolithic optical taps formed as part of wavelength tunable EAM 112 as described in allowed U.S. patent application Ser. No. 10/218,289 entitled STABILIZING ELECTRO-ABSORPTION MODULATORS (EAM'S) PERFORMANCE BY MAINTAINING CONSTANT ABSORPTION WITH THE USE OF INTEGRATED TAP COUPLERS. In this instance, beam splitters 110 are omitted.

Wavelength tunable EAM 112 is coupled to RF driver 114, bias voltage supply 116, and temperature controller 118. Both bias voltage supply 116 and temperature controller 118 may be adjusted singly to tune the response of EAM 112, though it may be desirable for temperature controller 118 to provide coarse tuning and bias voltage supply 116 to provide fine tuning of the response of EAM 112. Controller 124 may provide dynamic control of the bias voltage and/or temperature of EAM 112 to maintain the desired performance level. This dynamic control may be desirable if the application envisions switching, or drifting, of the peak wavelength of laser 100, or to automatically compensate for possible aging effects in wavelength tunable EAM 112. Typically though, the desired bias voltage and temperature settings of wavelength tunable EAM 112 may be determined manually and maintained in an exemplary optical communications system without such monitoring.

Laser 100 is desirably a narrow bandwidth optical source, such as a distributed feedback laser (DFB). Laser 110 may be tunable or may be designed to operate at a specific peak wavelength. The thermal wavelength shift of many lasers, particularly DFB's, is significantly less than the thermal wavelength shift of typical EAM's. Therefore, if laser 100 is temperature tuned, it may be desirable for laser 100 and wavelength tunable EAM 112 to have separate temperature control.

FIG. 2 illustrates an exemplary method of tuning a wavelength tunable EAM using the exemplary configuration of FIG. 1. A reference average power loss factor for light of a reference peak wavelength is provided, step 200. This reference average power loss factor is the ratio of the average output power to average input power of wavelength tunable EAM 112 during optimal operation at the reference peak wavelength. It is based on light having the reference peak wavelength modulated by wavelength tunable EAM 112 using a reference bias voltage, a reference temperature, and a reference modulation signal. The reference modulation signal has a predetermined duty cycle. The duty cycle is desirably 50% to ensure consistent results. Modulation signals having other duty cycles may be used, but their use may undesirably lead to additional calculations for proper tuning. The reference bias voltage and temperature are selected to provide for optimal operation of wavelength tunable EAM 112 at the reference peak wavelength. For wide bandwidth performance, it may be desirable to provide several sets of reference bias voltages and reference temperatures corresponding to different reference peak wavelengths to improve the speed and accuracy of tuning across the wide bandwidth. Exemplary values for the various reference parameters determined from experiments are described below with reference to FIGS. 6–21.

The average input power of input light beam 106 is determined, step 202. Input light beam 106 has an operational peak wavelength within the tuning bandwidth of wavelength tunable EAM 112. The average input power may be calculated from the average power of rear facet leakage light 104 detected by photodetector 102 or from the average power of tapped light signal 108 detected by photodetector 103.

Input light beam 106 is optically coupled into wavelength tunable EAM 112, step 204, and modulated therein, step 206, using a modulation signal with the same duty factor as the reference modulation signal, desirably 50%. The bias voltage and the temperature of wavelength tunable EAM 112 may desirably be set to their respective reference values. If several sets of reference values are provided, the bias voltage and temperature may desirably be set to the reference bias voltage and reference temperature corresponding to the reference wavelength closest to the operational wavelength.

The average output power of the modulated light beam 120 emitted from wavelength tunable EAM 112 is determined, step 208, from the average power of tapped light signal 122 detected by photodetector 126. Significantly, it is the average input and average output powers that are determined, not the instantaneous powers. This simplifies the tuning process and equipment used in the tuning process, substantially. Low-speed electronics and low-cost photodetectors may be used, even for tuning of EAM's designed for high speed, gigahertz range, modulation.

The average output power of modulated light beam 120 is divided by the average input power of input light beam 106 to calculate an average power loss factor for the modulated light, step 210. It is noted that, if beam splitters 110 and photodetectors 103 and 126 are matched, it may be desirable to calculate the average power loss factor directly from the photocurrents of photodetectors 103 and 126, without first calculating the average input power and the average output power.

The calculated average power loss factor is compared to the reference average power loss factor, step 212, to determine the desired tuning adjustments. As described below with reference to FIGS. 6–21, it has been shown that tuning of wavelength tunable EAM 112 may be achieved by maintaining the average power loss factor of light modulated by the wavelength tunable EAM throughout the tuning bandwidth.

Two alternative methods for substantially equalizing the average power loss factor and the reference average power loss factor are contemplated in the exemplary embodiment of FIG. 2: 1) adjusting the temperature of the wavelength tunable EAM, step 214; and 2) adjusting the bias voltage of the wavelength tunable EAM, step 216. The average power loss factor is directly related to the operating bias voltage of the EAM. Thus, increasing the bias voltage of wavelength tunable EAM 112 (i.e. making the bias voltage less negative) may increase the average power loss factor and decreasing the bias voltage (i.e. making the bias voltage more negative) may reduce the average power loss factor. The average power loss factor is inversely related to the operating temperature of the EAM. Thus, increasing the temperature of wavelength tunable EAM 112 may reduce the average power loss factor and decreasing the temperature may increase the average power loss factor.

The peak wavelength tuning of wavelength tunable EAM 112 is very sensitive to temperature, offering a relatively large tuning range for a small temperature change, on the order of 0.5 nm per 1° C. The peak wavelength tuning of wavelength tunable EAM 112 is not as sensitive to bias voltage, on the order of 0.025 nm per 1 mV. This may reduce the effective bias voltage tuning range compared to the effective temperature tuning range of wavelength tunable EAM 112, but it may also allow for more precise control during tuning. Additionally, bias voltage tuning may have a quicker response time, which may help tuning accuracy as well.

Although either one, or both, of these alternative tuning methods may be used, it is contemplated that temperature tuning, step 214, may be more desirable to provide course tuning of the average power loss factor of wavelength tunable EAM 112 to within a predetermined range of the reference average power loss factor, for example, within approximately 0.5 dB. Then bias voltage tuning, step 216, may be used to provide fine-tuning of the average power loss factor. Using a combination of temperature tuning, step 214, to provide coarse control of the center wavelength and bias voltage adjustment, step 216, to provide fine control of average output power and dispersion penalty equalization by either of the methods described above may increase the tunable bandwidth of a single wavelength tunable EAM. Such a combination tuning method may allow one wavelength tunable EAM to cover the entire C-band or L-band.

Once the average power loss factor and the reference average power loss factor have been substantially equalized by either temperature tuning, step 214, or bias voltage tuning, step 216, tuning of the wavelength tunable EAM is completed, step 218.

FIG. 3 illustrates an alternative exemplary method of tuning wavelength tunable EAM 112 using the exemplary configuration of FIG. 1. This exemplary method is similar to the exemplary method of FIG. 2, but is based on maintaining an average output power of modulated light beam 120 rather than an average power loss factor for the EAM.

A reference average output power for modulated light of a reference peak wavelength having a set average input power is provided, step 300. This reference average output power is based on modulation by wavelength tunable EAM 112 using a reference bias voltage, a reference temperature, and a reference modulation signal. The reference modulation signal has a predetermined duty cycle, desirably 50%. The reference bias voltage and temperature are selected to provide for optimal operation of wavelength tunable EAM 112 at the reference peak wavelength. For wide bandwidth performance, it may be desirable to provide several sets of reference bias voltages and reference temperatures corresponding to different reference peak wavelengths to improve the speed and accuracy of tuning across the wide bandwidth. Exemplary values for the various reference parameters determined from experiments are described below with reference to FIGS. 6–21.

One convenient method to select the desired average input power may be to select a power level that saturates the absorption of wavelength tunable EAM 112. In the case of a configuration which includes a semiconductor optical amplifier (SOA) (not shown) in front of wavelength tunable EAM 112, it is noted that the SOA may be used to amplify light beam 106 from laser 100 to saturate the EAM. The SOA may be a separate optical component. Alternatively, the SOA may be monolithically integrated with laser 100 or may be monolithically integrated EAM 112, as in T-Networks EAMP™ amplified optical modulator chip.

Input light beam 106 is optically coupled into wavelength tunable EAM 112, step 302, and modulated therein, step 304, using a modulation signal with the same duty factor as the reference modulation signal, desirably 50%. Input light beam 106 has an operational peak wavelength within the tuning bandwidth of wavelength tunable EAM 112 and is maintained at approximately the same set input power that was used to determine the reference average output power. The average input power may be calculated from the average power of rear facet leakage light 104 detected by photodetector 102 or from the average power of tapped light signal 108 detected by photodetector 103. Alternatively, a reference average photocurrent for either photodetector 102 or 103 may be specified and maintained instead of an average input power of input light beam 106.

The bias voltage and the temperature of wavelength tunable EAM 112 may desirably be set to their respective reference values. If several sets of reference values are provided, the bias voltage and temperature may desirably be set to the reference bias voltage and reference temperature corresponding to the reference wavelength closest to the operational wavelength.

The average output power of the modulated light beam 120 emitted from wavelength tunable EAM 112 is determined, step 306, from the average power of tapped light signal 122 detected by photodetector 126. As in the exemplary embodiment of FIG. 2, it is the average input and average output powers (or average photocurrents) that are determined, not the instantaneous powers. It is noted that, if beam splitters 110 and photodetectors 103 and 126 are matched, it may be desirable to specify a reference average photocurrent of photodetector 126, obviating the need to calculate the average output power.

The average output power is compared to the reference average output power, step 308, to determine the desired tuning adjustments. As described below with reference to FIGS. 6–21, it has been shown that tuning of wavelength tunable EAM 112 may be achieved by maintaining the average output power of light modulated by the wavelength tunable EAM throughout the tuning bandwidth.

Two alternative methods for substantially equalizing the average output power and the reference average output power are contemplated in the exemplary embodiment of FIG. 3: 1) adjusting the temperature of the wavelength tunable EAM, step 310; and 2) adjusting the bias voltage of the wavelength tunable EAM, step 312. The average output power is directly related to the operating bias voltage and is inversely related to the operating temperature of the EAM.

Either one, or both, of these alternative tuning methods, step 310 and 312 may be used. Similarly to the exemplary method of FIG. 2, it is contemplated that temperature tuning, step 310, may be more desirable to provide course tuning of the average output power of wavelength tunable EAM 112 to within a predetermined range of the reference average output power, for example, within approximately 0.5 dB. Then bias voltage tuning, step 312, may be used to provide fine-tuning of the average output power.

Once the average output power and the reference average output power have been substantially equalized by either temperature tuning, step 310, or bias voltage tuning, step 312, tuning of the wavelength tunable EAM is completed, step 314.

Figure 4:
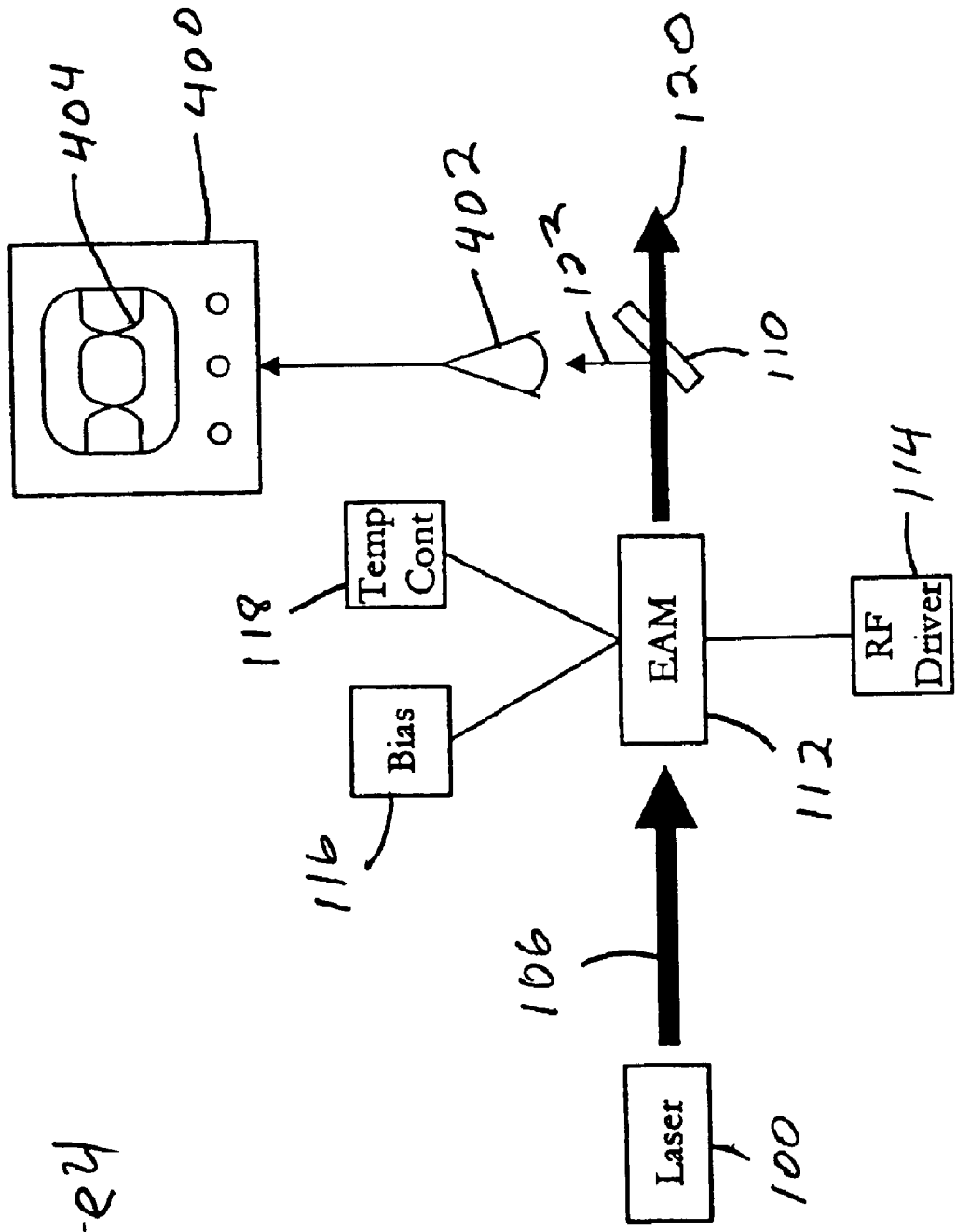
FIG. 4 is a block diagram of an alternative exemplary configuration for tuning a wavelength tunable EAM according to the present invention.
Figure 5:
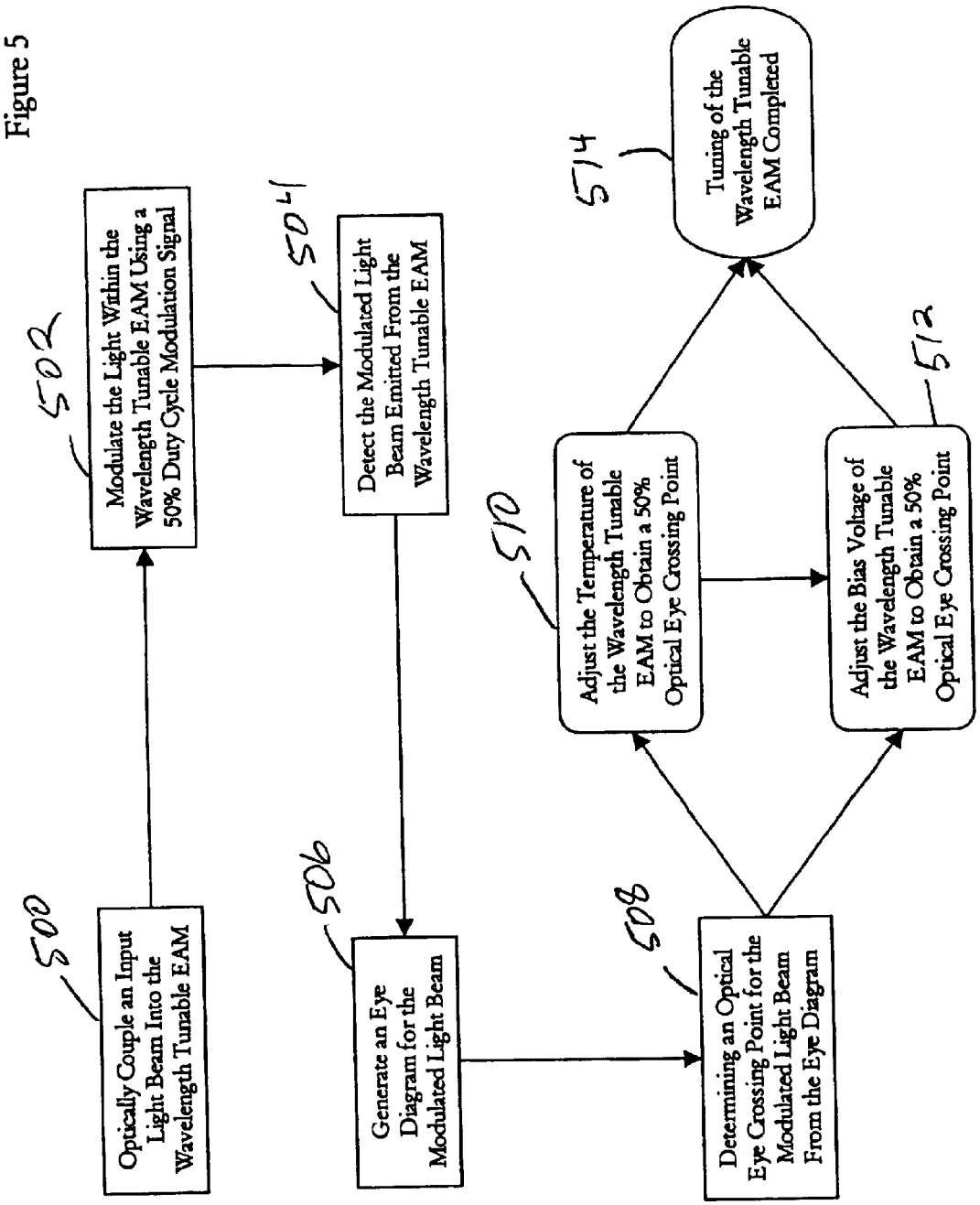
FIG. 5 is a flowchart illustrating an alternative exemplary method of tuning a wavelength tunable EAM using the exemplary configuration of FIG. 4.

FIG. 4 illustrates an alternative exemplary configuration that may be to tune wavelength tunable EAM, using the exemplary method of FIG. 5. This exemplary configuration is similar to the exemplary configuration of FIG. 1, except for the means employed for detecting the light beams. Since the exemplary method of FIG. 5 does not require knowledge of the average input power, photodetectors 102 and 103 may be omitted. High-speed photodetector 402 replaces photodetector 126 to provide a signal proportional to the instantaneous output power of modulated light beam 120. High-speed photodetector 402 is coupled to oscilloscope 400, which is desirably a digital oscilloscope adjusted to provide exemplary eye diagram 404, illustrating various modulation characteristics of modulated light beam 120.

FIG. 5 illustrates an alternative exemplary method of tuning wavelength tunable EAM 112 using the exemplary configuration of FIG. 4. This exemplary method is similar to the exemplary methods of FIGS. 2 and 3, but is based on maintaining a 50% optical eye crossing point on eye diagram 404.

Input light beam 106 is optically coupled into wavelength tunable EAM 112, step 500, and modulated therein, step 502, using a 50% duty cycle modulation signal. Input light beam 106 has an operational peak wavelength within the tuning bandwidth of wavelength tunable EAM 112. It may be desirable to provide a reference bias voltage and a reference temperature for optimal operation at a reference wavelength. If a reference bias voltage and temperature are provided, these values may desirably be used as initial settings for wavelength tunable EAM 112. For wide bandwidth tuning, it may be desirable to provide several sets of reference bias voltages and reference temperatures corresponding to different reference peak wavelengths to improve the speed and accuracy of tuning across the wide bandwidth. In this case, the reference values corresponding to the reference wavelength nearest to the operation wavelength may desirably be used for the initial values.

Modulated light beam 120 emitted from wavelength tunable EAM 112 is detected, step 504, using high-speed photodetector 402. Oscilloscope 400 then generates an eye diagram for the modulated light beam, step 506. The optical eye crossing point is then determined from the eye diagram, step 508. FIGS. 11A–11F illustrate exemplary screen captures of eye diagrams 1100 that may be obtained experimentally. These exemplary eye diagrams include arrows marking upper signal levels 1102 and lower signal levels 1104, digital 1's and 0's, respectively. Optical eye crossing points 1106, where a rising signal going from 0 to 1 crossing a falling signal going from 1 to 0, are also shown. As described below with reference to FIGS. 6–21, it has been found that desirable signal modulation performance is maintained by wavelength tunable EAM 112 for parameters which produce eye diagrams with 50% optical eye crossing points. That is eye diagrams in which optical eye crossing points 1106 lie halfway between upper signal levels 1102 and lower signal levels 1104.

Two alternative methods for adjusting the eye diagram to obtain a 50% crossing point are contemplated in the exemplary embodiment of FIG. 5: 1) adjusting the temperature of the wavelength tunable EAM, step 510; and 2) adjusting the bias voltage of the wavelength tunable EAM, step 512. The optimal bias voltage is approximately inversely proportional to the operational wavelength for a constant temperature, and the optimal operational temperature is directly related to the operational wavelength for a constant bias voltage.

Either one, or both, of these alternative tuning methods, step 510 and 512 may be used. Similarly to the exemplary methods of FIGS. 2 and 3, it is contemplated that temperature tuning, step 510, may be more desirable to provide course tuning of wavelength tunable EAM 112. Then bias voltage tuning, step 512, may be used to provide fine-tuning of the optical eye crossing point. It may be desirable to provide a set of reference temperatures corresponding to different wavelength ranges within the operational bandwidth of wavelength tunable EAM 112. Then temperature tuning, step 510 involves setting the operational temperature to the reference temperature for the appropriate wavelength range and adjusting the bias voltage to obtain the desired 50% optical eye crossing point.

Once the desired 50% optical eye crossing point has been obtained by either temperature tuning, step 510, or bias voltage tuning, step 512, tuning of the wavelength tunable EAM is completed, step 514.

I. Experimental Results, Overview

Three distinct experiments were studied. The results of these experiments are presented with reference to FIGS. 6–21.

The first experiment (Case A) involves a control test of wavelength tunable EAM 112 with a fixed bias voltage, fixed RF data driver amplitude, and fixed temperature. This is the baseline application of the EAM's. This experiment was conducted within a bandwidth of 2.8 nm centered around the designed wavelengths of two exemplary wavelength tunable EAM's. The output optical power, the dynamic optical extinction ratio (ER), and the dispersion penalty (DP) over 1,600 ps/nm are fully characterized, and the results are summarized in Section III. The second experiment (Case B) illustrates the performance of an exemplary wavelength tunable EAM in a 5.6 nm bandwidth. The average output power and dispersion penalty are desirably equalized by adjusting the bias voltage, with other parameters fixed, as in Case A. The results of Case B are presented in Section IV. In the third experiment (Case C), EAM tunability is demonstrated over a much wider wavelength bandwidth (15 nm). This experiment is again based on the equalization of the average output power and dispersion penalty by adjusting the EAM bias voltage. The results of Case C are detailed in Section V. The experimental set-up and the test conditions are described in the immediate next section, Section II, and finally Section VI contains the conclusions on the EAM tunability.

II. Experimental Set-Up and Test Conditions

Figure 6:
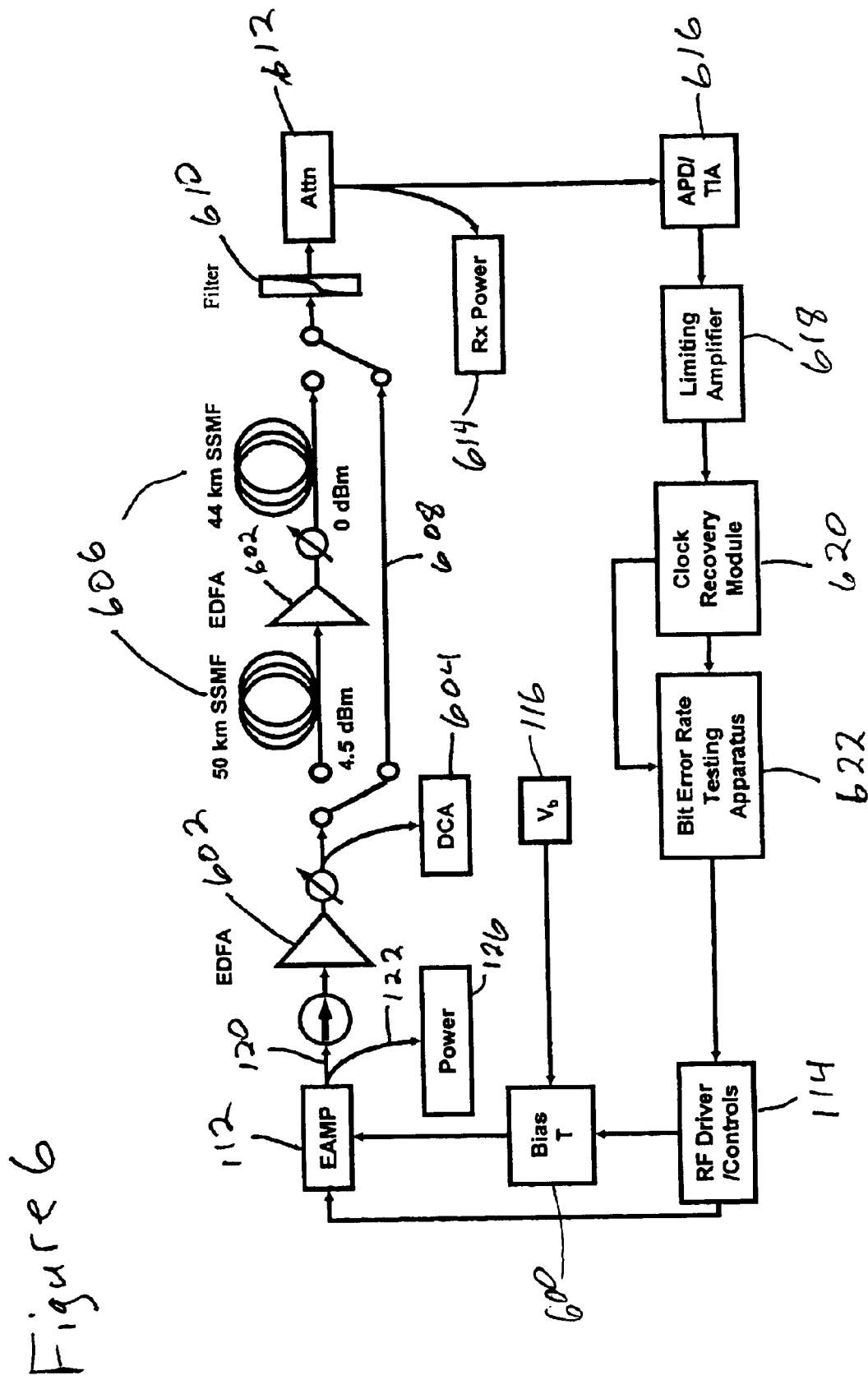
FIG. 6 is a block diagram of an exemplary configuration for testing the performance of a wavelength tunable EAM tuned according to the present invention.

The block diagram in FIG. 6 illustrates the experimental test set-up used to measure the dispersion penalty (DP) of wavelength tunable EAM 112, as well as to characterize the dynamic extinction ratio (ER) and output optical power in the following exemplary experiments. An Advantest BERT, bit error rate testing apparatus 622, is used as the RF data pattern generator and the error detector. The transmission data are a pseudo-random bit-sequence (PRBS) in non-return-to-zero (NRZ) format, with a standard SONET bit-rate of 9.95328 Gb/s and with a pattern length of $2^{31}-1$. High sensitivity photo-detector based on avalanche photo-diode and trans-impedance amplifier 616 (e.g. an APD/TIA or DSC-R402 device available from Discovery Semiconductors) is coupled directly to a limiting amplifier 618 (for example, a VM10LA-155TO device available from JDSU), and then to a clock recovery module 620 (for example, a VM10CRM device available from JDSU) to complete the optical receiver. The RF data and recovered clock are then feed back to bit error rate testing apparatus 622 for error analysis. A high-speed digital communication analyzer 604 (for example, an 86100A DCA available from Agilent) with an 86109A optical module is used to observe the optical eye diagrams and to measure the dynamic extinction ratio. The dispersion penalty, defined as the receiver power sensitivity degradation at designated pattern length and bit error ratio (BER), $2^{31}-1$ and $10^{-12}$, respectively here, is measured over a span of 94 km standard single mode fiber (SSMF) 606 that has a total nominal dispersion value of 1600 ps/nm. Short fiber link 608 may be used to determine a baseline, 0 km, BER. The optical power applied to the first fiber span of SSMF 606 is kept at 4.5 dBm to limit the nonlinear effects self-phase-modulation (SPM) in the fiber and also to accommodate the optical power budget in this optical link. Filter 610 and attenuator 612 may be used to ensure the desired signal power for detection. Receiver power detector 614 may be used to monitor the power level to of the transmitted beam. Two erbium-doped fiber amplifiers (EDFA's) 602 are used to compensate all the optical power losses due to SSMF 606, various optical couplers, switches and attenuators in the optical signal path. The launched power into the second span is 0 dBm.

Wavelength tunable EAM's 112 used in these experiments are T-Networks EAMP™ devices and the LIM™ modules. These devices have an EAM section and a semiconductor optical amplifier (SOA) section, as well as taps 126 to monitor the optical power, all integrated monolithically. For Case A, measurements are done on the hybrid integrated circuits (HIC) level before the devices are packaged. A negative bias voltage close to −2.0 V is applied through a bias-Tee 600 to the wavelength tunable EAM 600 and is kept constant at its reference value for each device. The RF data drive voltage is chosen to be 2.8 V for all the experiments and wavelength tunable EAM's 112 are driven with RF driver 114 (for example, an OKI evaluation module). Note that the RF driver voltage level is much lower than that of a Lithium-Niobate (LiNbO3) Mach-Zehnder modulator (MZM), which is often 6V or higher. The bias current to the SOA is fixed at approximately 100 mA, and the temperature of wavelength tunable EAM is controlled to about 35° C. in all experiments. The optical input power to the fiber pigtail of EAM is set to approximately 10 dBm, directly from a tunable laser source (for example, a TUNICS-BT laser available from GN Netest), and is desirably polarization-optimized for coupling to the wavelength tunable EAM.

In Case B, measurements are also carried out on the HIC level, with the bias voltage adjusted only to equalize (or correct) the average output power and dispersion penalty. Everything else is same as in Case A. In Case C, measurements are done with packaged devices, and bias voltage adjustment is used to equalize the wavelength tuning performance of wavelength tunable EAM 112 over a much wider bandwidth (15 nm) than in Case B. The SOA current is set at approximately 120 mA and the input power to the device is approximately 11 dBm in Case C. In all three Cases, an optical eye crossing point of approximately 50% is maintained by either adjusting the electrical pulse width control available in the RF driver (Case A), or as a result of adjusting the bias voltages (Case B and Case C).

III. EAM Baseline Performance in 2.8 nm Bandwidth—Case A

Figure 7:
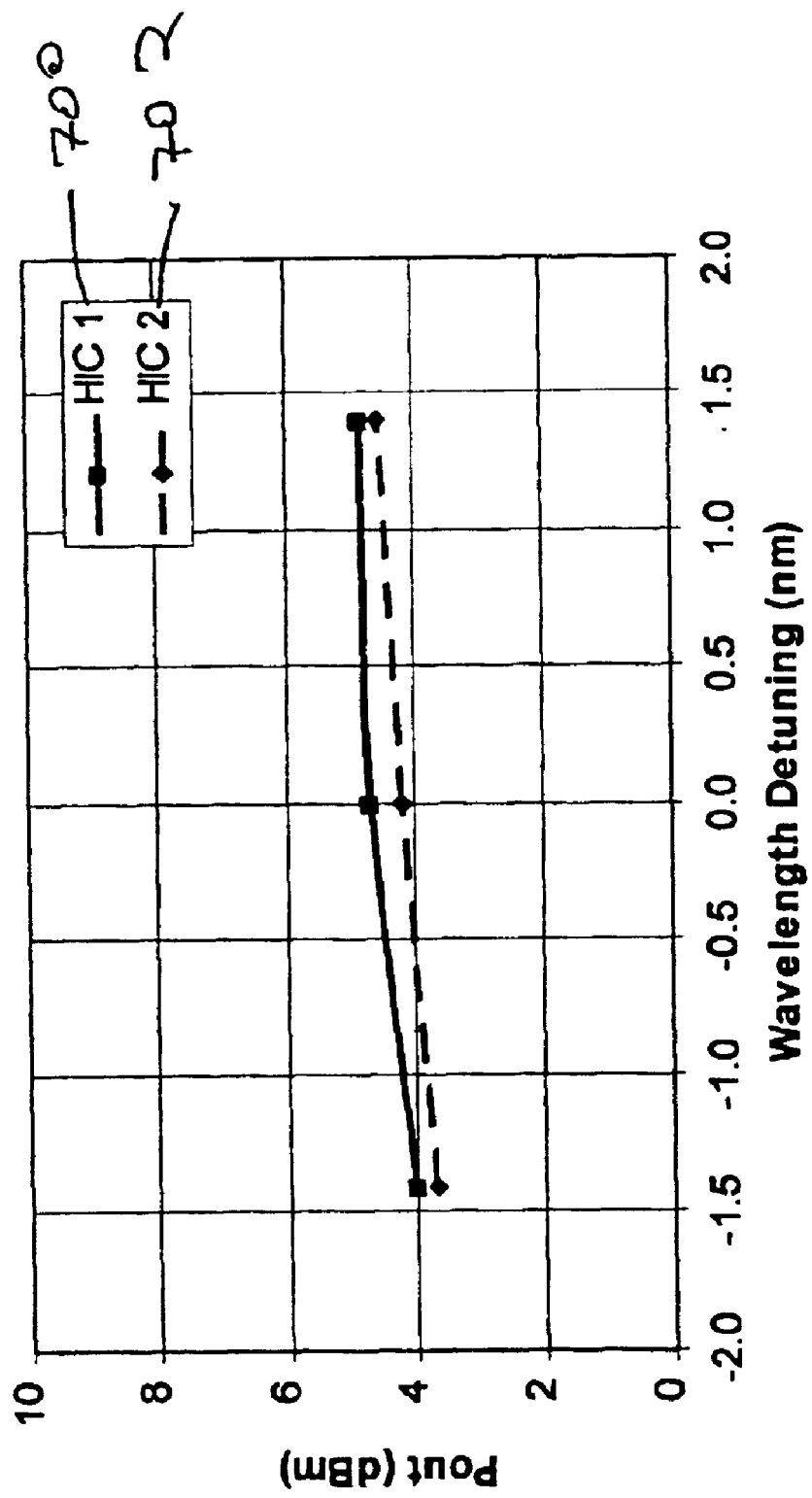

Two exemplary EAMP™ devices on an HIC packaging level are used for the experiments in this section. The exemplary wavelength tunable EAM's have a designed center wavelength of 1552.5 nm, and their reference bias voltages are −1.84V (HIC1) and −1.8V (HIC2), respectively. FIG. 7 shows the average output optical powers 700 and 702 of those two EAM's as a function of wavelength detuning from their center wavelength, at a constant input power level of 10 dBm. The output light carries the NRZ data (50% duty cycle) already and therefore, the average optical power suffers a 3 dB natural modulation loss. In addition, there are losses for coupling in and out of the EAM chips from two fiber ends and also the material absorption in the EAM waveguide itself. The average output power is higher at longer wavelength side, as expected, due to the smaller absorption coefficients there at a fixed bias voltage. Within a bandwidth of 2.8 nm, the output power remains close to or above 4 dBm, as desired.

Figure 8:
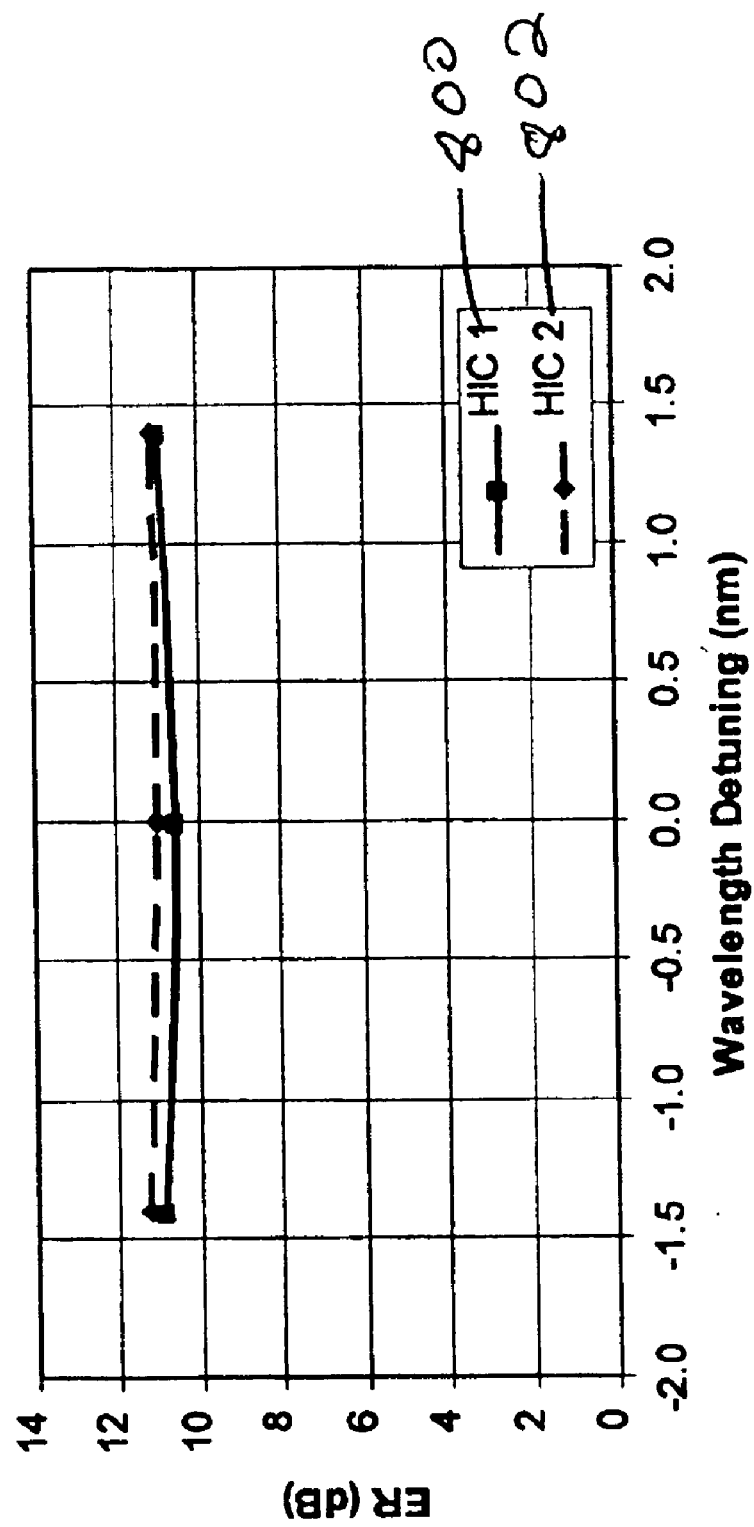

In FIG. 8, the optical dynamic extinction ratios (ER's) of the two exemplary wavelength tunable EAM's (800 and 802) are plotted against the wavelength detuning. Dynamic in this context refers to the situation of high-speed modulation. The behavior of the static ER of an EAM at a dc bias voltage is often different than the dynamic ER, and the static ER is generally better than that of dynamic ER. For the two exemplary EAM devices (HIC1 and HIC2), the dynamic ER's are desirably close to 11 dB within the 2.8 nm bandwidth.

Figure 9:
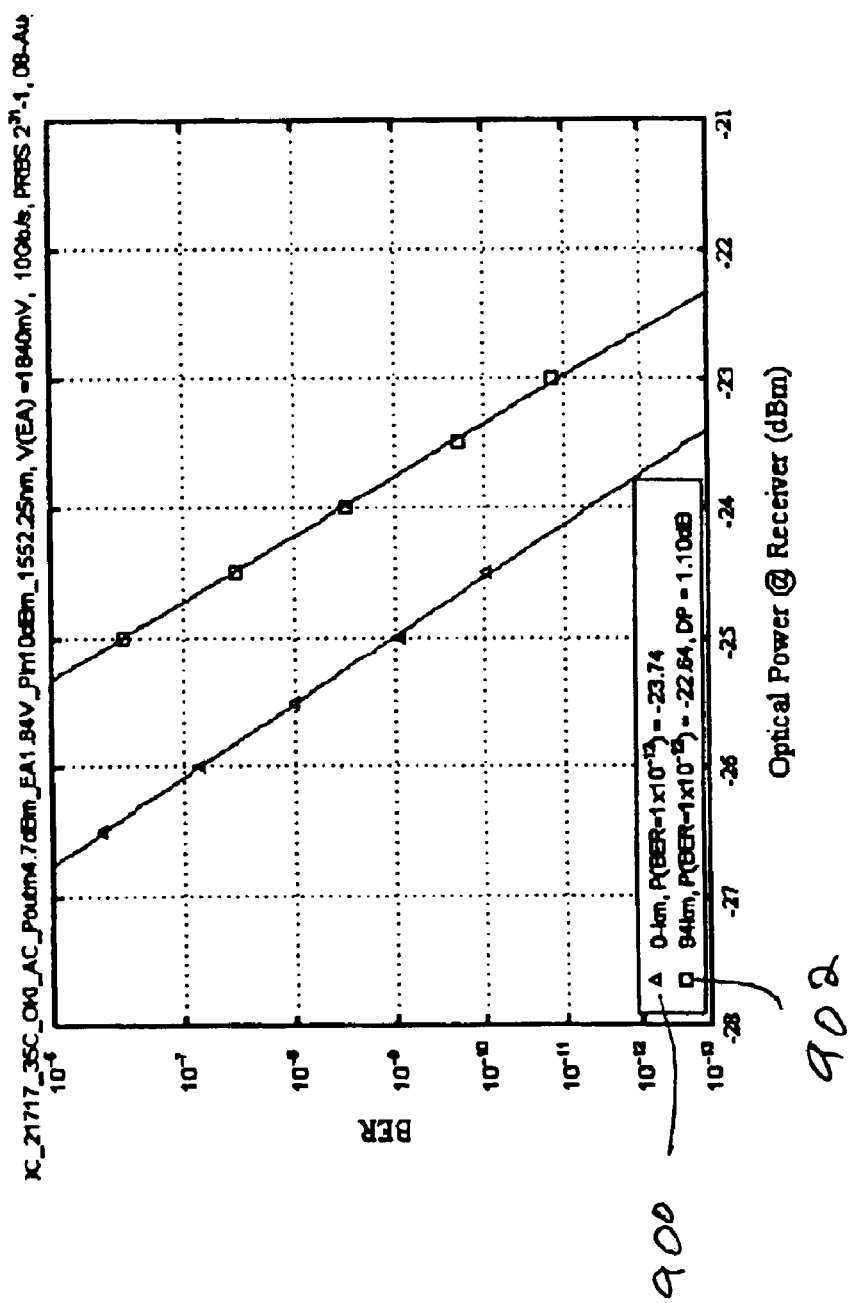
FIG. 9 is a graph illustrating the experimental bit error rate of an exemplary EAM.

FIG. 9 shows a typical bit-error-ratio (BER) plot from the dispersion power penalty measurements by using the test set-up in FIG. 6. The dispersion penalty is obtained by extrapolating from the BER measurements from above $10^{-10}$ down to a BER of $10^{-12}$, because of the practical limitation of error accumulation time, for both the back-to-back, data 900, or through fiber, data 902, cases. A summary of all the dispersion penalty results is plotted in FIG. 10, for HIC1 1000 and HIC2 1002. The dispersion penalty values are small, 2 dB and less, across the whole 2.8 nm bandwidth. Note that the dispersion penalty is specific to the fiber chromatic dispersion and to the launched power into the fiber, as well as the receiver architecture and parameter settings. In these exemplary experiments, 94 km SSMF 606 that has a nominal dispersion value of 1,600 ps/nm was used. In FIG. 10, the dispersion penalty becomes smaller towards shorter wavelength due to increased negative chirp.

Figure 11A:
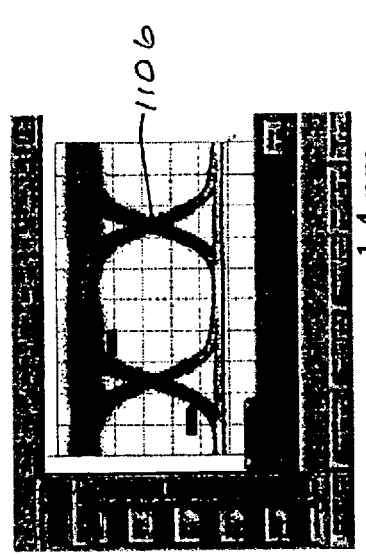
FIGS. 11A, 11B, 11C, 11D, 11E, and 11F are exemplary "eye diagrams" of optical signals modulated by exemplary EAM's.
Figure 11B:
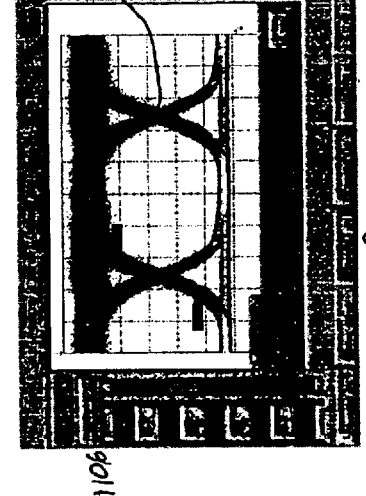
Figure 11C:
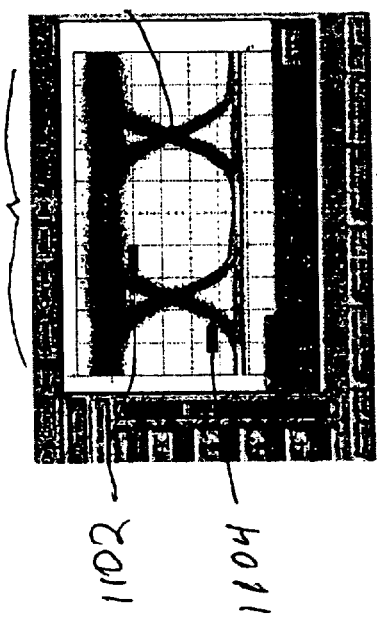
Figure 11D:
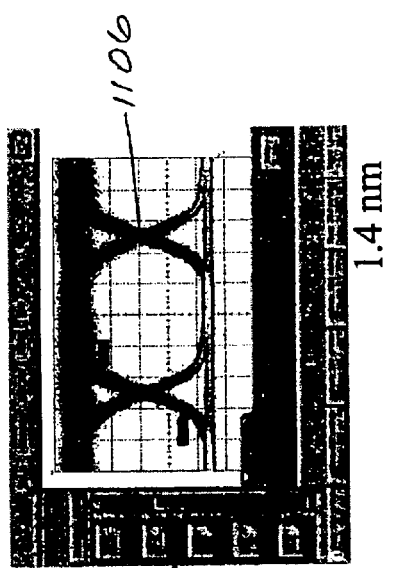
Figure 11E:
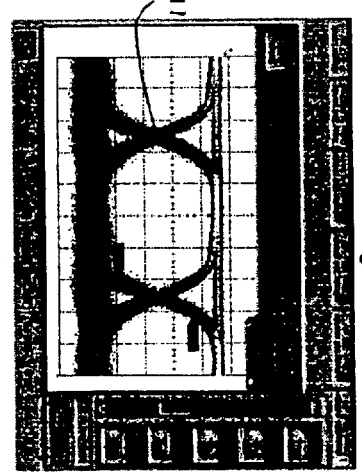
Figure 11F:
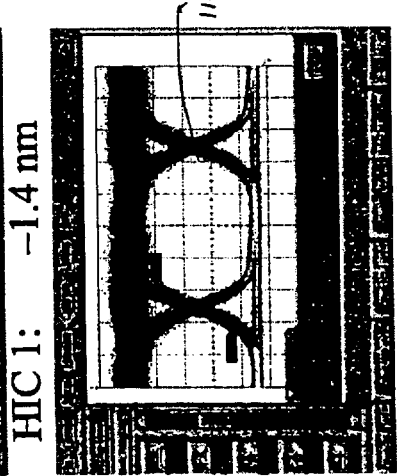

FIGS. 11A–F, show optical eye diagrams of the modulated light signals from the two exemplary EAM devices that are applied to the fiber, in correspondence to the dispersion penalty data shown in FIG. 10. FIGS. 11A–C illustrate optical eye diagrams for HIC1 at −1.4 nm, 0 nm, and 1.4 nm detuning, respectively. FIGS. 11D–F illustrate optical eye diagrams for HIC2 at −1.4 nm, 0 nm, and 1.4 nm detuning, respectively. All of those eye diagrams are of high quality with widely open, clean eyes, high extinction ratios, desirable 50% optical eye crossing points, and low phase jitter. The 50% optical eye crossing point in the exemplary optical eye diagrams of FIGS. 11A–F are achieved by electrical pulse width adjustment of RF driver 114.

Although data presented in this section are sufficient to support the wavelength tunability of EAM's for use in conjunction with optical sources, such as distributed feedback lasers, in a 2.8 nm bandwidth, less deviation in average optical output power and particularly less deviation in dispersion penalty may be desirable to increase the signal system margin. Extending the useful tuning bandwidth may be desirable as well. At the same time, it is desirable that these advantages be achieved with a simple and low cost algorithm. Control of the bias voltage of wavelength tunable EAM 112 may provide such a vehicle conveniently, as shown in Case B.

Figure 12:
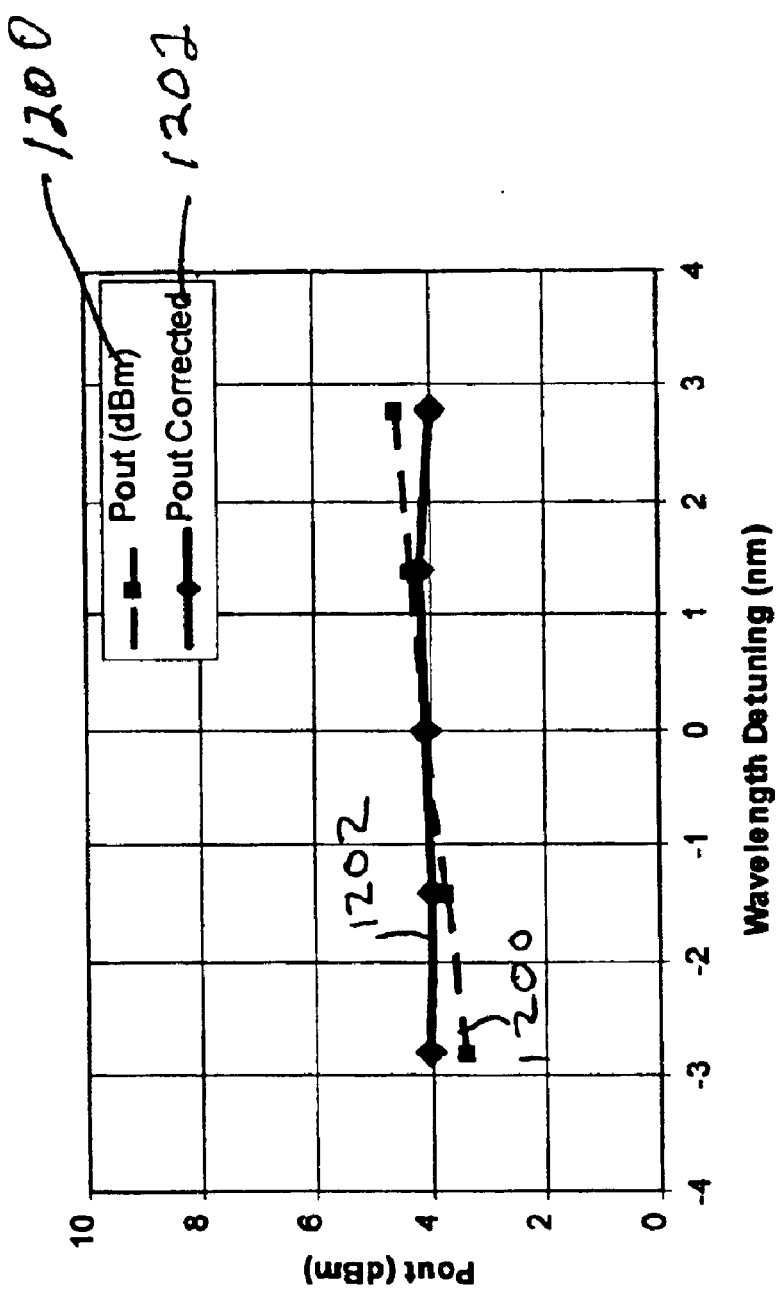
FIGS. 12, 13, and 14 are graphs illustrating the experimental tuning of an exemplary EAM according to the present invention over 5.6 µm.

IV. Equalization of Average Output Power and Dispersion Penalty within 5.6 nm—Case B An exemplary EAMP™ device (HIC 510C-21716, with tap) is used to make all the exemplary measurements in this section. This exemplary device has a designed reference peak wavelength of 1552.5 nm and a reference bias voltage of −1.86V at that wavelength. FIG. 12, shows the average optical output power as a function of wavelength detuning of 5.6 nm, before (data 1200) and after equalization, or correction, by bias voltage adjustment (data 1202). The input optical power level is set at 10 dBm and the SOA current is 100 mA. As shown in this Figure, within a 5.6 nm bandwidth, the average output power can be corrected to around 4 dBm with a spread of only about 0.25 dB by adjusting the bias voltage, compared to the uncorrected average output power variation of about 1.2 dB.

Figure 13:
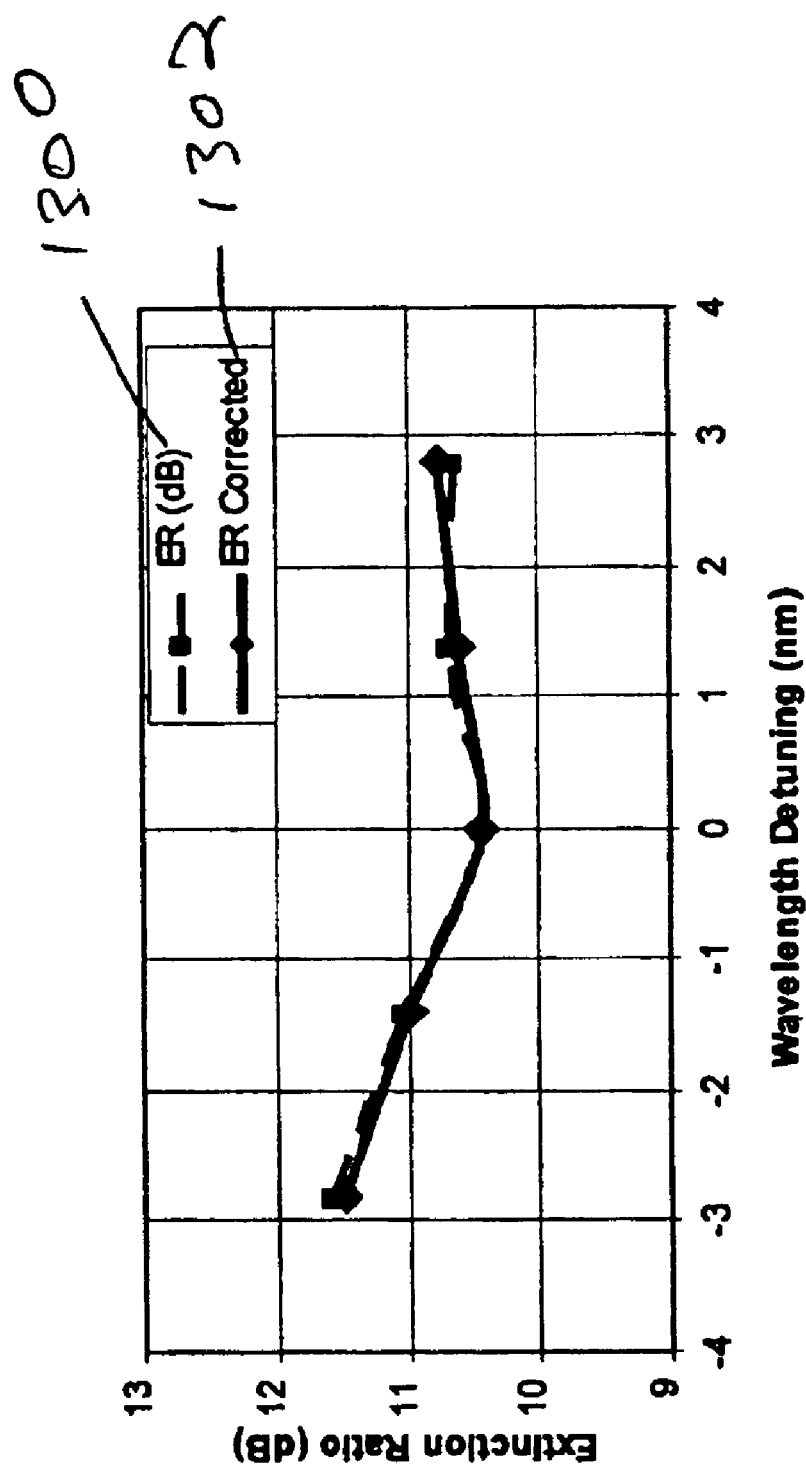
Figure 14:
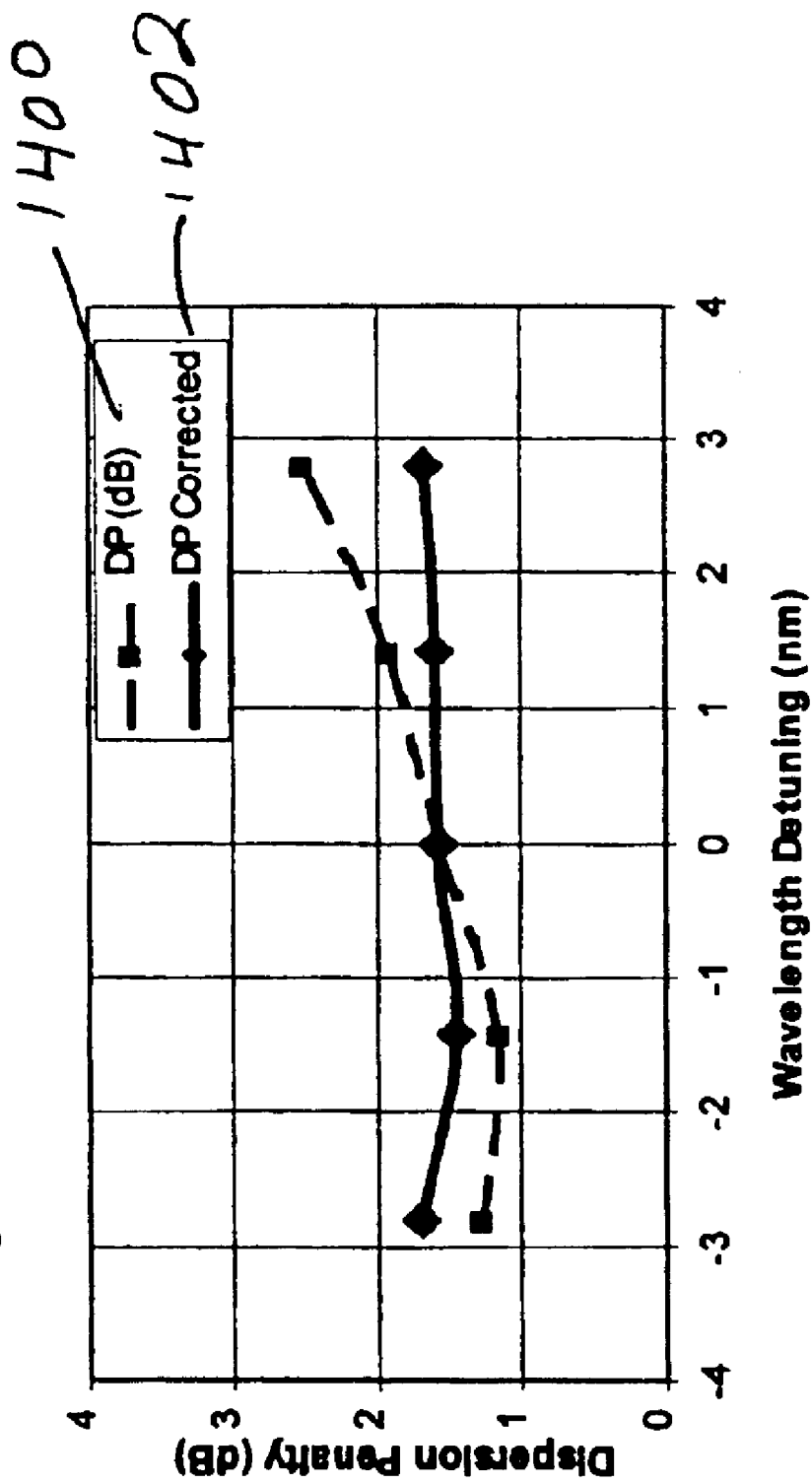

In FIG. 13, the corresponding optical extinction ratio (ER) is plotted against the wavelength detuning, before (data 1300) and after bias voltage equalization (data 1302). Note that the ER remains above 10.5 dB and is not significantly affected by the bias voltage adjustment, as desired. FIG. 14 shows that the equalized dispersion penalty, over the wavelength bandwidth of 5.6 nm, may desirably be reduced to 1.7 dB or below for the bias voltage corrected data 1402. Particularly, the higher DP values at longer wavelengths can be successfully reduced by about 1 dB from the values of uncorrected data 1400. Overall, the DP is corrected to a spread of about 0.22 dB from an uncorrected variation of about 1.3 dB.

Also, it is noted that an approximately 50% optical eye crossing point is achieved in optical eye diagrams for all wavelengths at the same time as the average output power and DP are equalized by bias voltage adjustment. This observation shows that adjusting the bias voltage to achieve an approximately 50% optical eye crossing point, while maintaining a constant electrical pulse width from the RF driver, may also be used as an algorithm for maintaining average output power and DP equalization.

Figure 15:
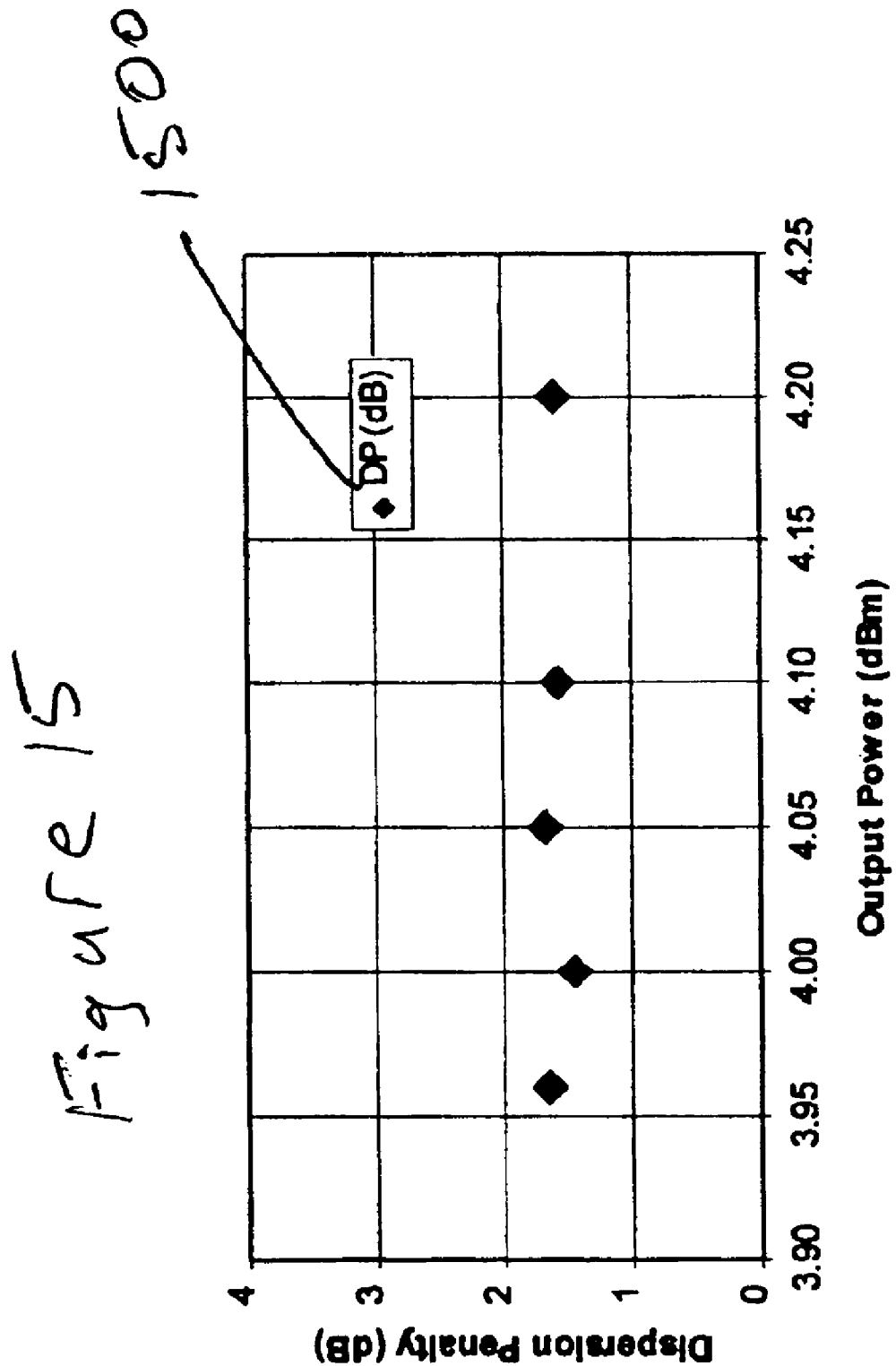
FIG. 15 is a graph illustrating the experimental performance of exemplary EAM's tuned according to the present invention over 5.6 µm.

Note that in FIGS. 12 and 14, both the uncorrected average output power and the uncorrected dispersion penalty increase at longer wavelength by an amount of approximately 1.2 dB and 1.3 dB, respectively. This reveals an empirical rule under which roughly 1 dB increase in average output power will correspond to about 1 dB increase in the dispersion penalty. In FIG. 15, the equalization results are summarized on DP versus $P_{out}$ plot 1500. In these experimental results, the DP is within a spread of approximately 0.22 dB and the $P_{out}$ within about 0.25 dB. These results also support the above empirical rule of average output power and dispersion penalty. This empirical rule may also be used to equalize the dispersion penalty in the field conveniently with an optical power meter as describe above in the exemplary methods of FIGS. 2 and 3.

Figure 16:
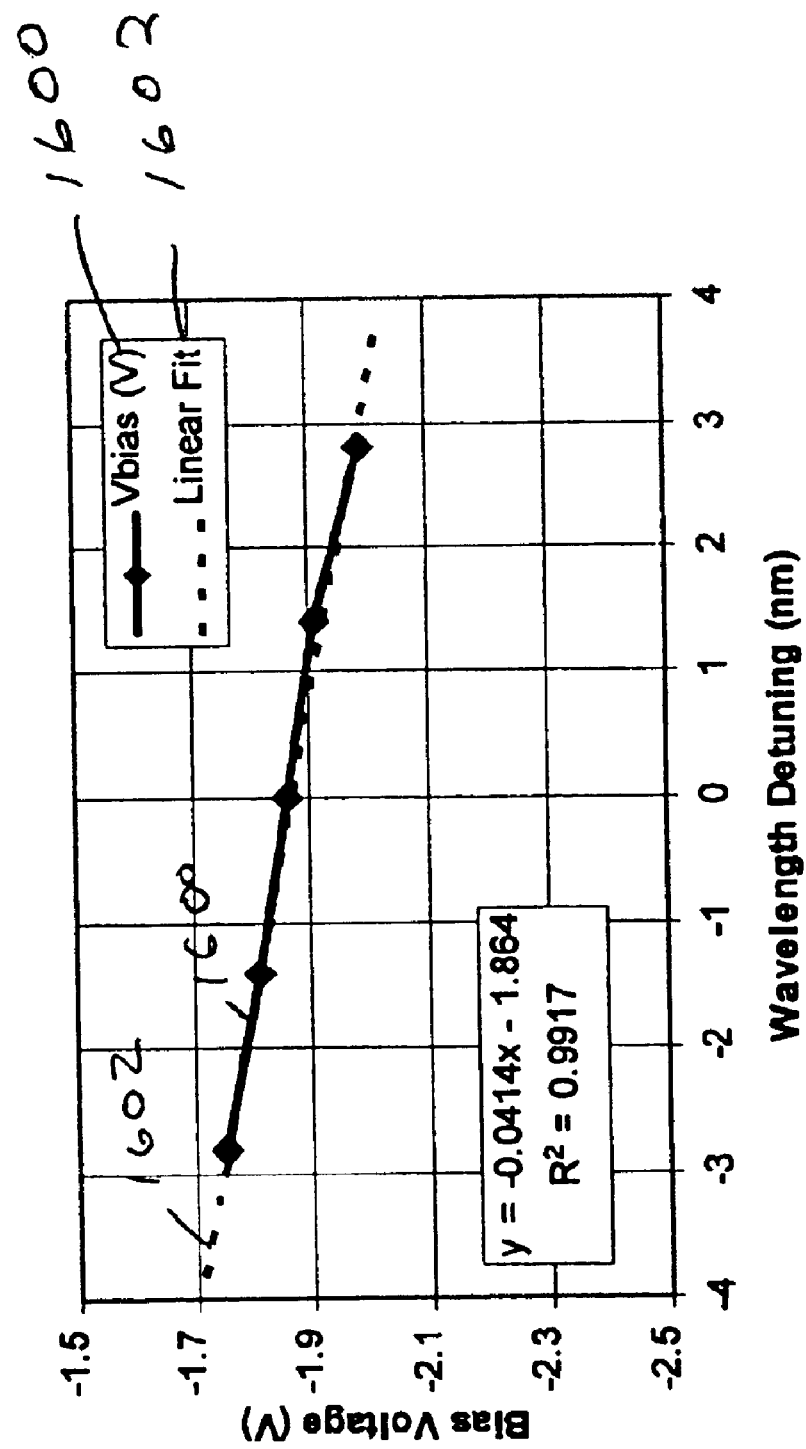
FIG. 16 is a graph illustrating the experimental tuning parameters of an exemplary EAM over 5.6 µm.

FIG. 16 examines the characteristics of the desired bias voltages values used to achieve the desirable equalization in both the output optical power and the dispersion penalty shown in FIGS. 12 and 14. Experimental bias voltage data 1600 may be seen to be approximated very well, for the exemplary 5.6 nm bandwidth, by straight line 1602, which corresponds to Equation (1).

$$V_{Bias}\ (\text{mV}) = -41.4\delta\lambda - 1864.0 \tag{1}$$

where $V_{Bias}$ is the desired bias voltage and $\delta\lambda$ is the wavelength detuning in nm. The exemplary bias voltage adjustment is, therefore, 41.4 mV/nm. Therefore, to tune over the entire 5.6 nm bandwidth of this experiment, the total exemplary equalization bias voltage change is less than 240 mV. This value is in agreement with previous measurements of the small signal chirp parameter of EAM's. This method of tuning wavelength tunable EAM 112 by bias voltage adjustment may be desirably convenient and cost-effective for transponder designers, as well as, WDM equipment manufacturers.

It is noted that equalization of the average output power in FIG. 12 and the equalization of dispersion penalty in FIG. 14 are achieved simultaneously by the bias voltage adjustments in FIG. 16. This desirable effect comes from a favorable cooperation of the average output power attenuation at higher bias voltages and the increased negative chirp introduced by wavelength tunable EAM 112 (and thereby, reduced dispersion penalty through the fiber), which also occurs at higher bias voltages. This favorable cooperation may be of great importance for inventory reductions, as well as applications in next generation systems incorporating widely tunable lasers to examine the practical applicable wavelength range in Equation (1). This is the topic of next section.

V. Wide Bandwidth (15 nm) Tunability of EAM's—Case C

Electro-absorption modulators are intrinsically wide-band (much more than 5.6 nm) devices, as far as optical transmission is concerned. However, dispersion penalty may not be acceptable in large bandwidth because of signal chirp from wavelength tunable EAM devices. To check the wide band dispersion penalty performance of EAM's, three exemplary packaged EAM modules (EAMP™ MOD104, T-Networks), labeled #1451, #1452, and #1453, are used for the measurements in this section.

Figure 17:
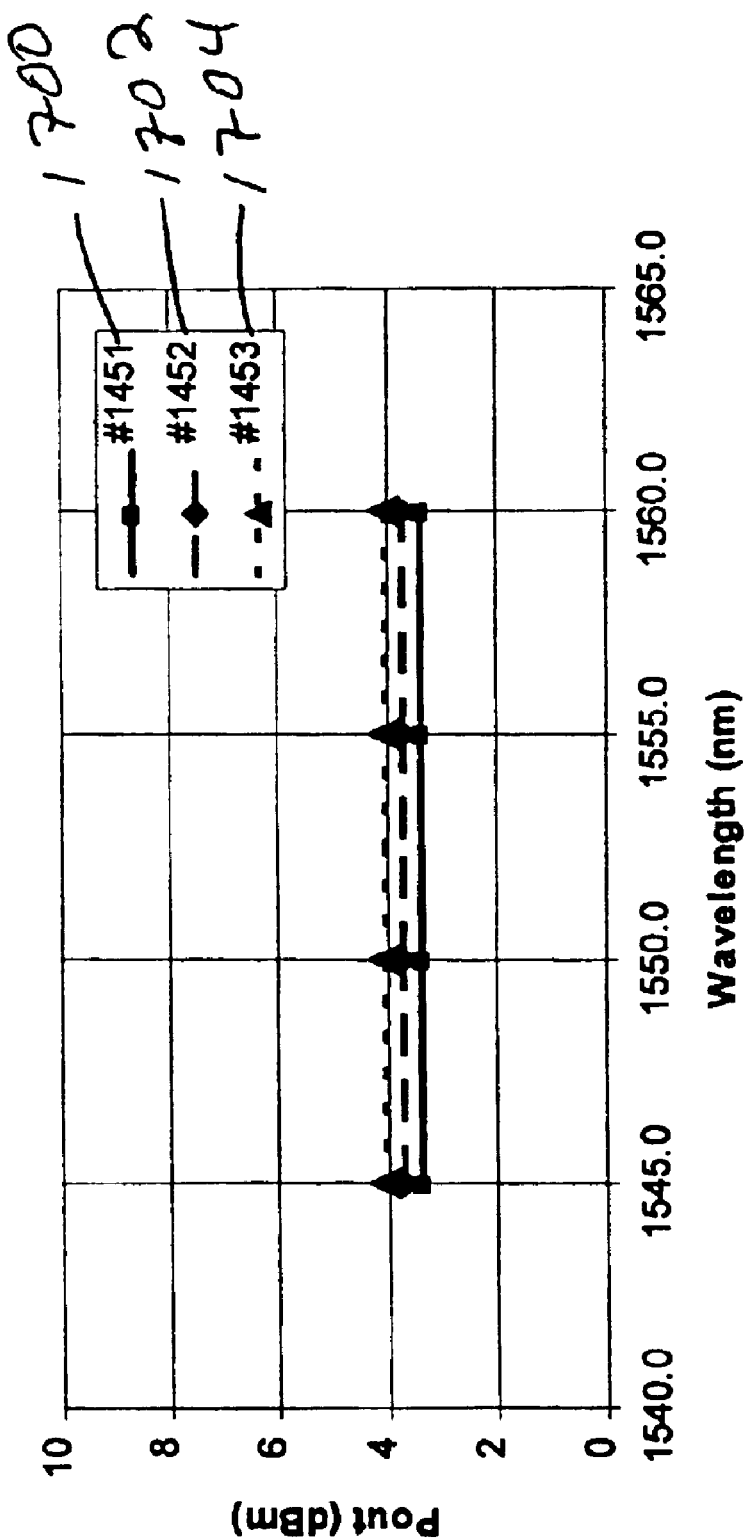
FIGS. 17, 18, and 19 are graphs illustrating the experimental tuning of exemplary EAM's according to the present invention over 15 µm.
Figure 18:
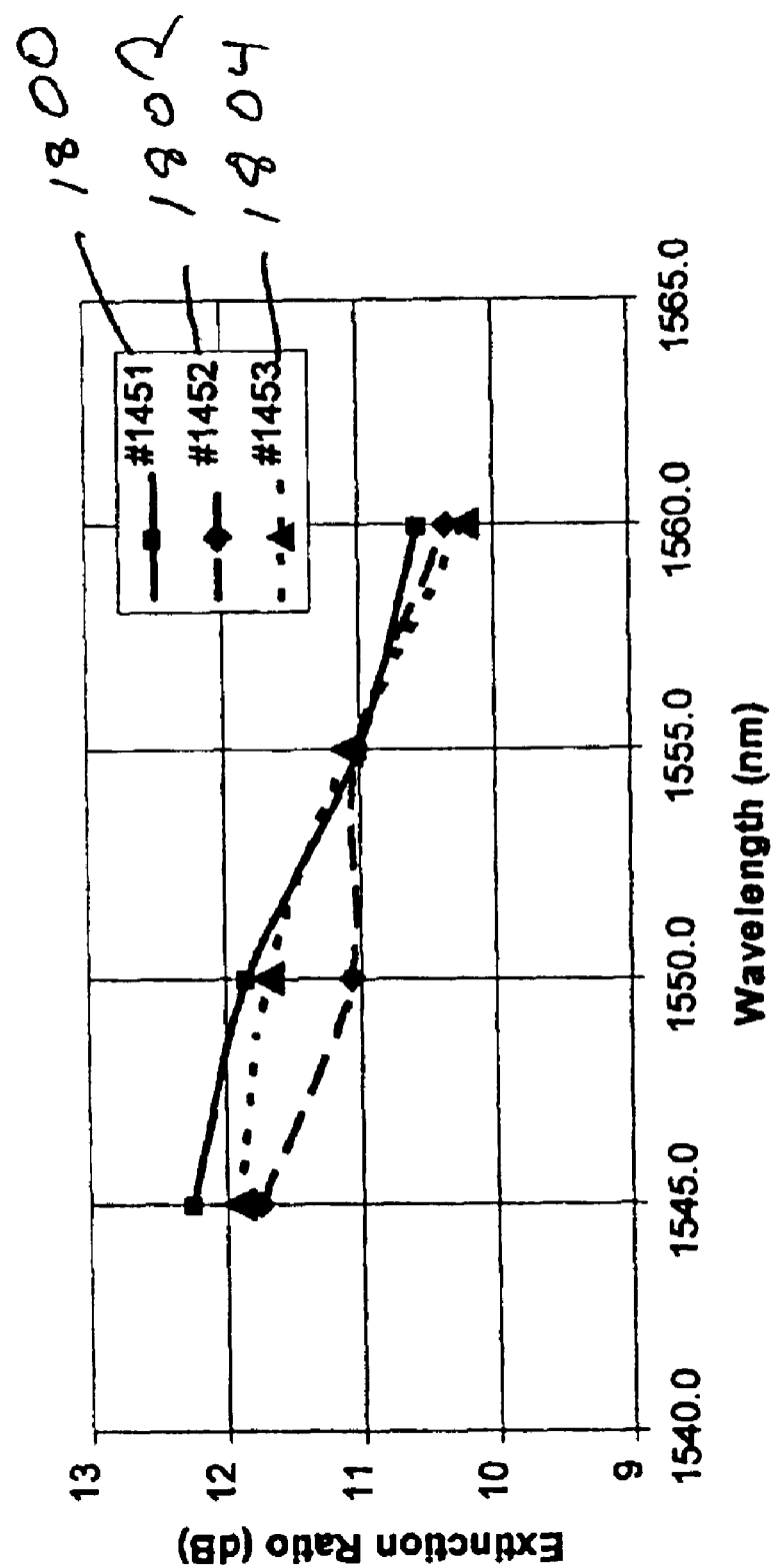
Figure 19:
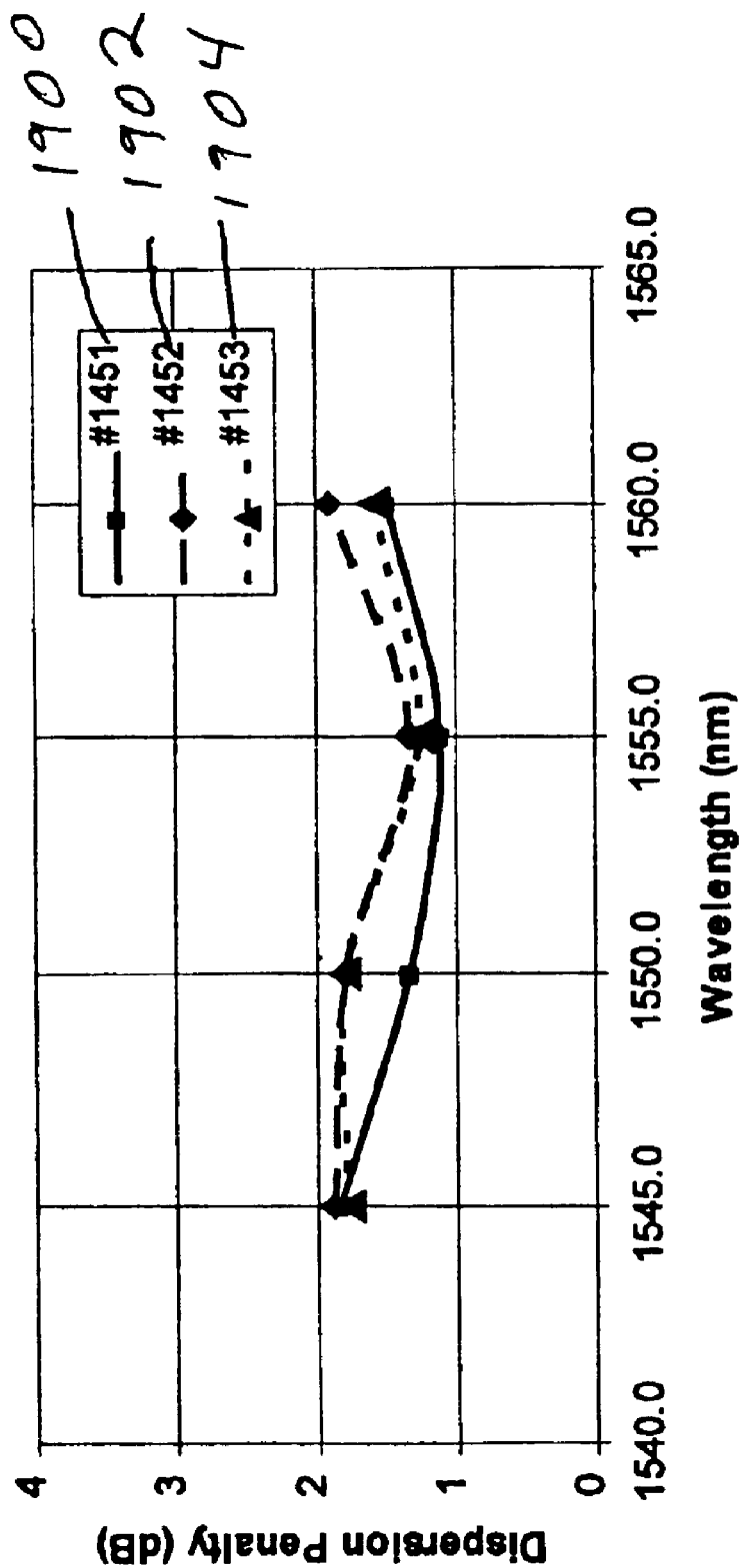

FIG. 17 shows the equalized average output power of these three exemplary EAM devices over a 15 nm bandwidth, using bias voltage as the only means for equalization. Data 1700 corresponds to #1451, data 1702 corresponds to #1452, and data 1704 corresponds to #1453. In FIG. 18, the measured extinction ratios, after bias voltage equalization, are shown over the 15 nm bandwidth also. Data 1800 corresponds to #1451, data 1802 corresponds to #1452, and data 1804 corresponds to #1453. All three sets of data desirably exceed 10.2 dBm. In FIG. 19, the equalized dispersion penalty values are plotted across the bandwidth. Data 1900 corresponds to #1451, data 1902 corresponds to #1452, and data 1904 corresponds to #1453. These exemplary DP's are all desirably between 1 dB and 2 dB. As in Case B, equalization of both the average output power and the dispersion penalty of an exemplary EAM may be achieved using bias voltage as the only means for equalization and maintaining either: 1) an equalized average output loss factor; 2) an equalized average optical output power; or 3) an about 50% optical eye crossing point. In Case C, these exemplary methods are shown to work over at least a 15 nm bandwidth.

Figure 20:
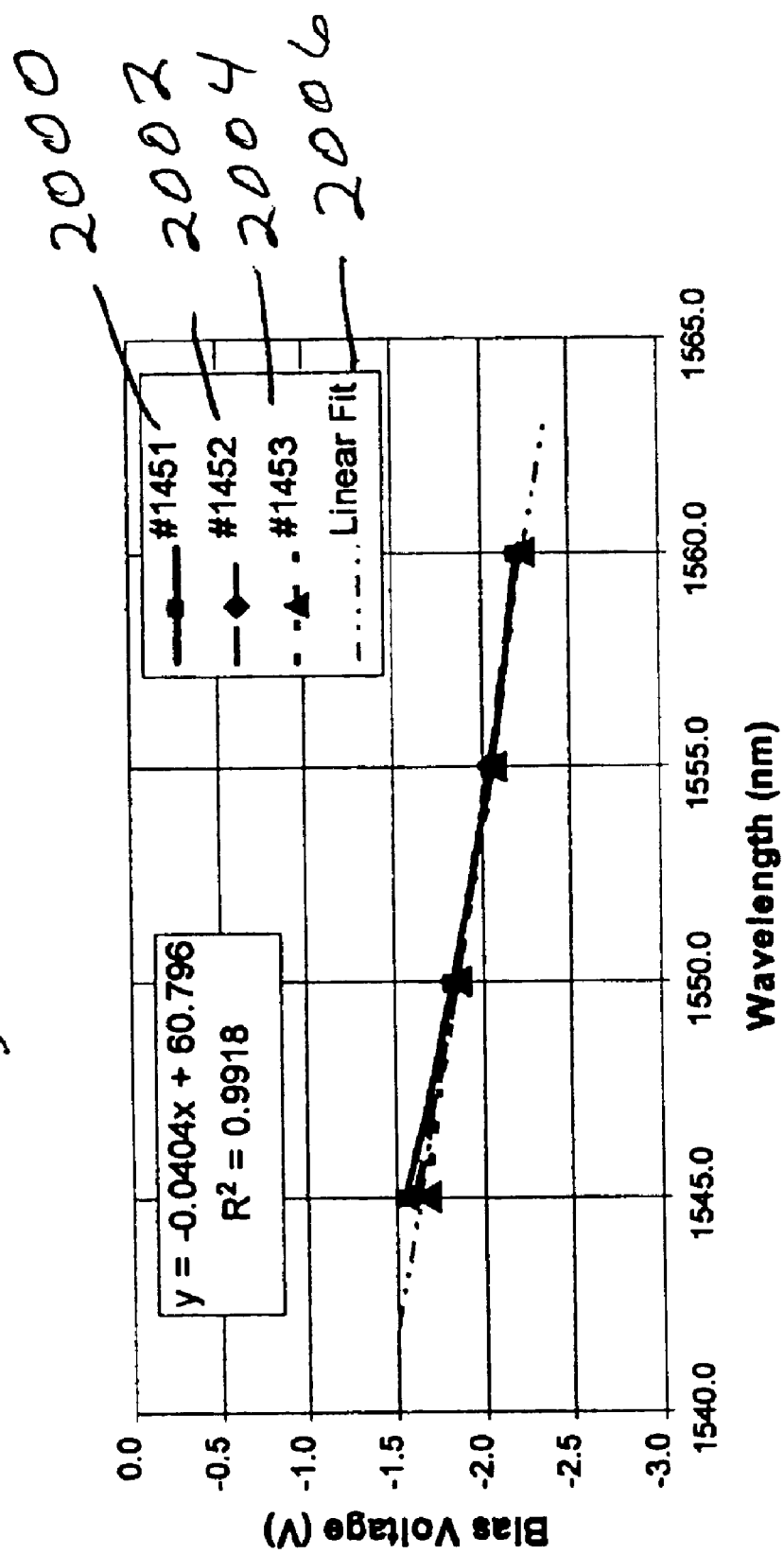
FIG. 20 is a graph illustrating the experimental tuning parameters of exemplary EAM's over 15 µm.

In FIG. 20, the desired EAM bias voltages used to equalize the average output power and dispersion penalty at different wavelengths are shown, for all three devices. Data 2000 corresponds to #1451, data 2002 corresponds to #1452, and data 2004 corresponds to #1453. Data 2006 shows a linear fit to the experimental data. These data confirm the previous finding of Case B (that a bias voltage adjustment of about 40 mV/nm may be used to equalize the average output power and the dispersion penalty) and illustrate that this relationship is applicable over the much wider wavelength bandwidth of 15 nm.

Figure 21:
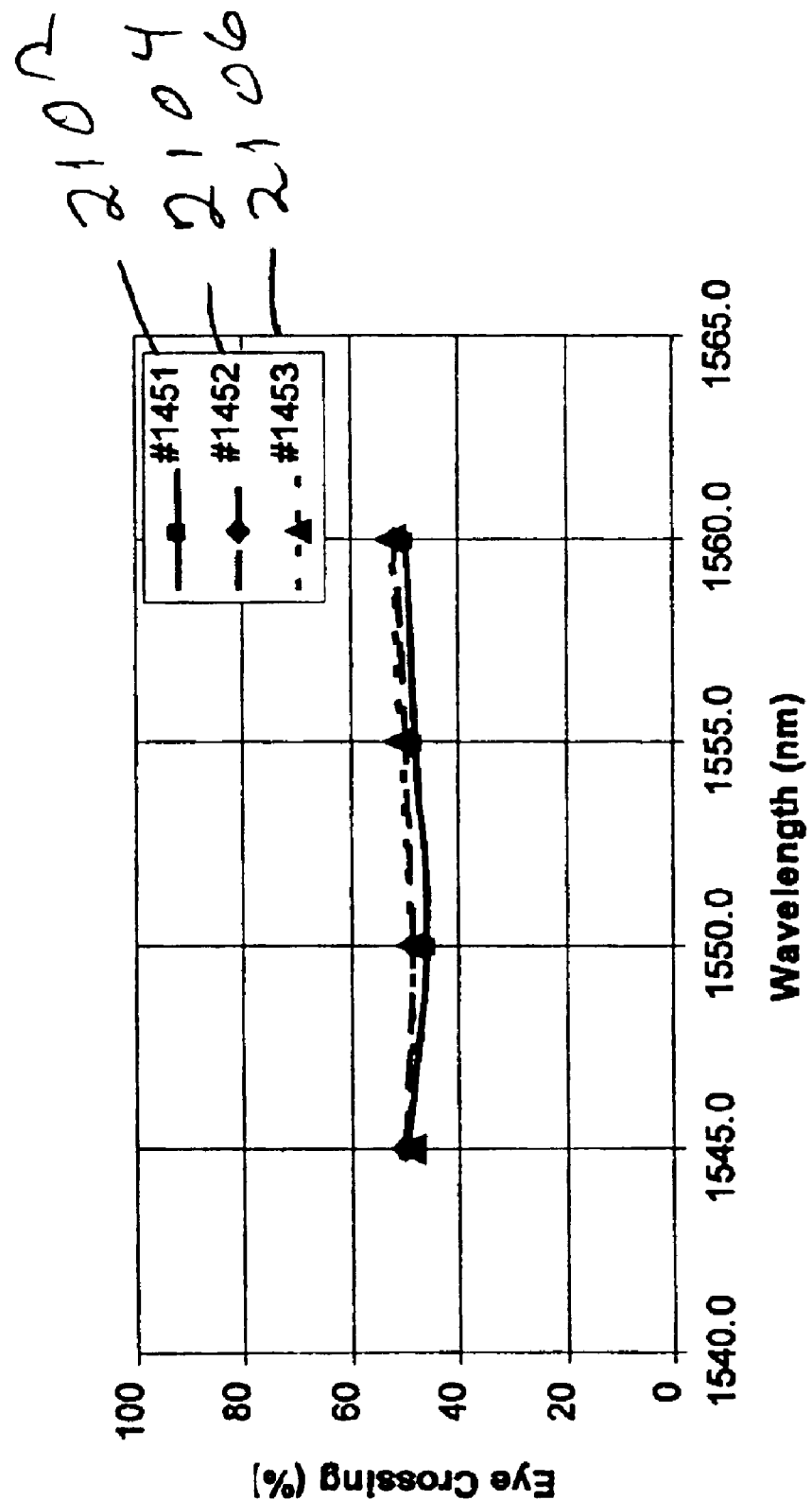
FIG. 21 is a graph illustrating the experimental support for the alternative exemplary tuning method of FIG. 5 for exemplary EAM's over 15 µm.

During this experiment, the optical eye crossing points of the three exemplary EAM devices were also measured over the 15 nm bandwidth. These optical eye crossing points, after bias voltage correction, are shown in FIG. 21. Data 2100 corresponds to #1451, data 2102 corresponds to #1452, and data 2104 corresponds to #1453. It is noted that the optical eye crossing points are all close to 50%.

VI. Conclusions

Tunability over a 15 nm bandwidth may enable one wavelength tunable EAM to support at least 5 distributed feedback lasers (DFB's), each DFB designed to provide an optical signal in a 2.8 nm wide wavelength bandwidth over a fiber optic link of 94 km SSMF, thus reducing the number of spare transmitters necessary. Also, a wavelength tunable EAM tunable over a 15 nm bandwidth may fully support a tunable distributed Bragg reflection (DBR) laser having an approximately 10 nm bandwidth. It is contemplated that two or three wavelength tunable EAM's designed with center operating wavelengths about 15 nm apart may desirably cover the entire C-band or L-band. It is noted that while tunability over a 15 nm bandwidth was shown experimentally, this is not to be construed a limit for the tunability of wavelength tunable EAM's.

EAM's may also be tuned using temperature. Using a combination of temperature tuning to provide coarse control of the center wavelength and EAM bias voltage adjustment to provide fine control of average output power and dispersion penalty equalization by either of the methods described above may increase the tunable bandwidth of a single EAM even farther. Such a combination tuning method may allow one single EAM to cover the entire C-band or L-band.

In the baseline case of 2.8 nm narrow bandwidth, the output optical power level is higher than 4 dBm, the dynamic extinction ratio (ER) is close to 11 dBm, and the dispersion penalty (DP) over 1,600 ps/nm is found to be below 2 dB. To operate with an equalized dispersion penalty, an exemplary method of altering the bias voltage of the EAM device to adjust the optical eye crossing point to 50%, without adjusting the electrical pulse width of the RF driver, may be used. This method also desirably simultaneously equalizes the average output power. Therefore, equalization of the average output power may be used as an alternative method to equalize the dispersion penalty.

Monitoring the optical eye crossing point, as in the exemplary method of FIG. 5, may be more convenient for use in a laboratory. The exemplary average power loss factor method of FIG. 2 and the exemplary average output power method of FIG. 3 may be more convenient for use in the field. In the exemplary EAM's tested, the average output power and the dispersion penalty were well equalized by an about 40 mV/nm linear bias voltage adjustment, increasing in voltage magnitude towards longer wavelength. As shown in Case C, this empirical rule applies up to at least 15 nm.

While the invention has been described with respect to particular embodiments, those of ordinary skill in the art will appreciate variations in steps, structure, and substitutions of materials that are within the scope of the invention as defined by the appended claims.

What is claimed:

1. A method of tuning a wavelength tunable electroabsorption modulator (EAM), comprising the steps of:

a) providing a reference average power loss factor for light having a reference peak wavelength that is modulated by the wavelength tunable EAM, the reference average power loss factor based on operation of the wavelength tunable EAM using a reference bias voltage, a reference temperature, and a reference modulation signal having a predetermined duty cycle;

b) optically coupling the input light beam into the wavelength tunable EAM;

c) modulating light within the wavelength tunable EAM using a modulation signal having the predetermined duty cycle;

d) measuring an input power of light provided to the wavelength tunable EAM and an average output power of light emitted from the wavelength tunable EAM to generate an average power loss factor;

e) comparing the average power loss factor to the reference average power loss factor; and f) adjusting at least one of a bias voltage and a temperature of the wavelength tunable EAM to reduce differences between the average power loss factor and the reference average power loss factor, thereby tuning the wavelength tunable EAM.

2. The method of claim 1, wherein the predetermined duty cycle is 50%.

3. The method of claim 1, wherein step (c) further includes the step of initially setting the bias voltage of the wavelength tunable EAM to the reference bias voltage and the temperature of the wavelength tunable EAM to the reference temperature.

4. The method of claim 1, wherein step (f) includes the steps of:

f1) decreasing the bias voltage of the wavelength tunable EAM when the average power loss factor is greater than the reference average power loss factor; and f2) increasing the bias voltage of the wavelength tunable EAM when the average power loss factor is less than the reference average power loss factor.

5. The method of claim 1, wherein step (f) includes the steps of:

f1) decreasing the temperature of the wavelength tunable EAM when the average power loss factor is less than the reference average power loss factor; and f2) increasing the temperature of the wavelength tunable EAM when the average power loss factor is greater than the reference average power loss factor.

6. The method of claim 1, wherein step (f) includes the steps of:

f1) adjusting the temperature of the wavelength tunable EAM to provide coarse control the average power loss factor when the average power loss factor and the reference average power loss factor exhibit an absolute difference that is greater than about 0.5 dB; and f2) adjusting the bias voltage of the wavelength tunable EAM to provide fine control the average power loss factor when the absolute difference between the average power loss factor and the reference average power loss factor is less than about 0.5 dB.

7. The method of claim 1, wherein:

step (a) includes the step of selecting the reference peak wavelength from a plurality of reference wavelengths such that the reference peak wavelength is closer to an operational peak wavelength of the light provided to the EAM than other reference wavelengths of the plurality of reference wavelengths;

step (c) further includes the step of setting the temperature of the wavelength tunable EAM to the reference temperature; and step (f) is the step of adjusting the bias voltage of the wavelength tunable EAM to substantially equalize the average power loss factor and the reference average power loss factor.

8. A method of tuning a wavelength tunable electroabsorption modulator (EAM), comprising the steps of:

a) providing a reference average output power for light that is modulated by the wavelength tunable EAM, the light having an input power and a reference peak wavelength, and the reference average output power based on operation of the wavelength tunable EAM using a reference bias voltage, a reference temperature, and a reference modulation signal having a predetermined duty cycle;

b) optically coupling an input light beam into the wavelength tunable EAM, the input light beam having approximately the input power and an operational peak wavelength;

c) modulating light within the wavelength tunable EAM using a modulation signal having the predetermined duty cycle;

d) measuring an average output power of a modulated light beam emitted from the wavelength tunable EAM;

e) comparing the average output power determined in step (d) to the reference average output power; and f) adjusting at least one of a bias voltage and a temperature of the wavelength tunable EAM to reduce differences between the average output power and the reference average output power, thereby tuning the wavelength tunable EAM.

9. The method of claim 8, wherein the predetermined duty cycle is 50%.

10. The method of claim 8, wherein step (c) further includes the step of initially setting the bias voltage of the wavelength tunable EAM to the reference bias voltage and the temperature of the wavelength tunable EAM to the reference temperature.

11. The method of claim 8, wherein step (f) includes the steps of:

f1) decreasing the bias voltage of the wavelength tunable EAM when the average output power is greater than the reference average output power; and f2) increasing the bias voltage of the wavelength tunable EAM when the average output power is less than the reference average output power.

12. The method of claim 8, wherein step (f) includes the steps of:

f1) decreasing the temperature of the wavelength tunable EAM when the average output power is less than the reference average output power; and f2) increasing the temperature of the wavelength tunable EAM when the average power loss factor is greater than the reference average power loss factor.

13. The method of claim 8, wherein step (f) includes the steps of:

f1) adjusting the temperature of the wavelength tunable EAM to provide coarse control the average output power when average output power and the reference average output power exhibit an absolute difference that is greater than about 0.5 dB; and f2) adjusting the bias voltage of the wavelength tunable EAM to provide fine control the average output power when the absolute difference between the average output power and the reference average output power is less than about 0.5 dB.

14. The method of claim 8, wherein:

step (a) includes the step of selecting the reference peak wavelength from a plurality of reference wavelengths such that the reference peak wavelength is closer to the operational peak wavelength than other reference wavelengths of the plurality of reference wavelengths;

step (c) further includes the step of setting the temperature of the wavelength tunable EAM to the reference temperature; and step (f) is the step of adjusting the bias voltage of the wavelength tunable EAM to substantially equalize the average output power and the reference average output power.

15. The method of claim 8, wherein:

the input power of the light used in step (a) is such that the wavelength tunable EAM is saturated by the light;

step (b) further includes the step of amplifying the input light beam in a semiconductor optical amplifier to increase an optical power of the input light beam to approximately the input power before it is coupled into the wavelength tunable EAM.

16. A method of tuning a wavelength tunable electroabsorption modulator (EAM), comprising the steps of:

a) optically coupling an input light beam into the wavelength tunable EAM, the input light beam having an operational peak wavelength;

b) modulating light within the wavelength tunable EAM using a modulation signal having a 50% duty cycle;

c) measuring a modulated light beam emitted from the wavelength tunable EAM to generate an eye diagram for the modulated light beam;

d) determining an optical eye crossing point for the modulated light beam from the eye diagram generated in step (d); and e) adjusting at least one of a bias voltage and a temperature of the wavelength tunable EAM such that the optical eye crossing point equals approximately 50%, thereby tuning the wavelength tunable EAM.

17. The method of claim 16, wherein:

step (b) further includes the step of initially setting the bias voltage of the wavelength tunable EAM to a reference bias voltage and the temperature of the wavelength tunable EAM to a reference temperature; and the reference bias voltage and the reference temperature are selected such that the optical eye crossing point equals 50% for modulation by the wavelength tunable EAM of light having a reference peak wavelength.

18. The method of claim 17, wherein step (e) includes the steps of:

e1) decreasing the bias voltage of the wavelength tunable EAM from the reference bias voltage to adjust the optical eye crossing point to approximately 50% when the operational peak wavelength is greater than the reference peak wavelength; and e2) increasing the bias voltage of the wavelength tunable EAM from the reference bias voltage to adjust the optical eye crossing point to approximately 50% when the operational peak wavelength is less than the reference peak wavelength.

19. The method of claim 17, wherein step (e) includes the steps of:

e1) decreasing the temperature of the wavelength tunable EAM from the reference temperature to adjust the optical eye crossing point to approximately 50% when the operational peak wavelength is less than the reference peak wavelength; and e2) increasing the temperature of the wavelength tunable EAM from the reference temperature to adjust the optical eye crossing point to approximately 50% when the operational peak wavelength is greater than the reference peak wavelength.

20. The method of claim 16, wherein:

the operational peak wavelength of the input light beam is within one wavelength range of a plurality of wavelength ranges, the plurality of wavelength ranges forming an operational bandwidth of the wavelength tunable EAM;

step (b) further includes the step of initially setting the bias voltage of the wavelength tunable EAM to a reference bias voltage and the temperature of the wavelength tunable EAM to a corresponding reference temperature for the one wavelength range which includes the operational peak wavelength;

the reference bias voltage and the corresponding reference temperature are selected such that the optical eye crossing point equals 50% for modulation by the wavelength tunable EAM of light having a corresponding reference peak wavelength, the corresponding reference peak wavelength being within the one wavelength range which includes the operational peak wavelength; and step (e) includes the steps of;
- e1) decreasing the bias voltage of the wavelength tunable EAM from the reference bias voltage to adjust the optical eye crossing point to approximately 50% when the operational peak wavelength is greater than the corresponding reference peak wavelength; and
- e2) increasing the bias voltage of the wavelength tunable EAM from the reference bias voltage to adjust the optical eye crossing point to approximately 50% when the operational peak wavelength is less than the corresponding reference peak wavelength.

* * * * *